US012769581B2

(12) United States Patent
White et al.

(10) Patent No.: US 12,769,581 B2
(45) **Date of Patent: *Oct. 20, 2026**

(54) METHOD AND SYSTEM FOR PROVISIONING APPLICATIONS IN A DISTRIBUTED MULTI-TIERED COMPUTING ENVIRONMENT

(71) Applicant: Dell Products L.P., Round Rock, TX (US)

(72) Inventors: William Jeffery White, Plano, TX (US); Said Tabet, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 511 days.

This patent is subject to a terminal disclaimer.

(21) Appl. No.: 17/722,066

(22) Filed: Apr. 15, 2022

(65) Prior Publication Data

US 2023/0333885 A1 Oct. 19, 2023

(51) Int. Cl.
*G06F 9/48* (2006.01)
*G06F 9/50* (2006.01)

(52) U.S. Cl.
CPC .......... *G06F 9/4881* (2013.01); *G06F 9/5033* (2013.01)

(58) Field of Classification Search
CPC ....... G06F 9/4843–5094; G06F 9/45533–5094
See application file for complete search history.

(56) References Cited

U.S. PATENT DOCUMENTS

| | | |
|---|---|---|
| 5,408,663 A | 4/1995 | Miller |
| 8,056,079 B1 | 11/2011 | Martin |
| 9,459,859 B2 | 10/2016 | Borden et al. |
| 10,120,669 B2 | 11/2018 | Karagiannis |
| 10,439,957 B1 | 10/2019 | Krottapalli et al. |
| 10,540,202 B1 | 1/2020 | Smaldone et al. |
| 10,693,872 B1 | 6/2020 | Larson et al. |
| 11,089,092 B1 | 8/2021 | Seibel |

(Continued)

OTHER PUBLICATIONS

CloudPath: A Multi-Tier Cloud Computing Framework Seyed Hossein Mortazavi, Mohammad Salehe, Carolina Simoes Gomes, Caleb Phillips, Eyal de Lara (Year: 2017).*

(Continued)

*Primary Examiner* — April Y Blair
*Assistant Examiner* — Paul V Mills
(74) *Attorney, Agent, or Firm* — Chamberlain, Hrdlicka, White, Williams & Aughtry; Aly Z. Dossa

(57) ABSTRACT

Techniques described herein relate to a method for managing a distributed multi-tiered computing (DMC) environment. The method includes obtaining, by a global controller, a DMC environment management request from a user; and in response to obtaining the request: making a first determination that the DMC environment management request is a create request, and the create request is associated with provisioning an application in the DMC environment; in response to the first determination: generating scheduling packages associated with target domains of the DMC environment based on the create request; sending the scheduling packages to local controllers associated with the target domains; obtaining application information from the local controllers; and providing the application information to the user.

17 Claims, 10 Drawing Sheets

(56) References Cited

U.S. PATENT DOCUMENTS

| | | | | |
|---|---|---|---|---|
| 11,184,269 | B1 | 11/2021 | Nee et al. | |
| 2002/0016729 | A1 | 2/2002 | Breitenbach | |
| 2007/0283351 | A1 | 12/2007 | Degenaro | |
| 2009/0300637 | A1* | 12/2009 | Ringseth | G06F 9/4881 718/104 |
| 2011/0154320 | A1* | 6/2011 | Verma | H04W 4/60 718/1 |
| 2012/0066759 | A1 | 3/2012 | Chen | |
| 2012/0179824 | A1* | 7/2012 | Jackson | H04L 47/827 709/226 |
| 2012/0284408 | A1* | 11/2012 | Dutta | G06F 9/5083 709/226 |
| 2013/0167152 | A1* | 6/2013 | Jeong | G06F 9/505 718/102 |
| 2013/0346993 | A1 | 12/2013 | Chen | |
| 2014/0343999 | A1 | 11/2014 | Kim | |
| 2015/0222604 | A1 | 8/2015 | Ylonen | |
| 2016/0011912 | A1 | 1/2016 | Rangaraju | |
| 2016/0085587 | A1 | 3/2016 | Dube | |
| 2016/0212007 | A1 | 7/2016 | Alatorre | |
| 2017/0149681 | A1 | 5/2017 | Chen et al. | |
| 2017/0201550 | A1 | 7/2017 | Benson et al. | |
| 2017/0257257 | A1 | 9/2017 | Dawes | |
| 2017/0339070 | A1* | 11/2017 | Chang | H04L 67/562 |
| 2018/0159745 | A1* | 6/2018 | Byers | H04L 41/12 |
| 2018/0287902 | A1 | 10/2018 | Chitalia | |
| 2018/0349183 | A1 | 12/2018 | Popovic | |
| 2019/0324828 | A1 | 10/2019 | Young | |
| 2020/0021537 | A1* | 1/2020 | Oliveira | H04L 47/72 |
| 2020/0159573 | A1 | 5/2020 | Dobrev | |
| 2020/0192714 | A1* | 6/2020 | Clow | G06F 9/5011 |
| 2020/0351337 | A1* | 11/2020 | Calmon | G06F 9/45558 |
| 2020/0401452 | A1* | 12/2020 | Piercey | G06F 9/5016 |
| 2021/0064492 | A1 | 3/2021 | Myers | |
| 2021/0294661 | A1* | 9/2021 | Turner | G06Q 30/08 |
| 2021/0360058 | A1 | 11/2021 | Tai | |
| 2022/0043677 | A1 | 2/2022 | Liret et al. | |
| 2022/0094690 | A1 | 3/2022 | Tarkhanyan | |
| 2022/0114033 | A1 | 4/2022 | Arvinte | |
| 2022/0116456 | A1 | 4/2022 | Higuchi | |
| 2022/0171653 | A1 | 6/2022 | Rj et al. | |
| 2022/0291952 | A1* | 9/2022 | Milojicic | G06F 9/5033 |
| 2022/0318052 | A1* | 10/2022 | Sivathanu | G06F 9/505 |
| 2023/0037293 | A1 | 2/2023 | Hu et al. | |
| 2023/0096811 | A1 | 3/2023 | Meghani | |
| 2023/0168875 | A1 | 6/2023 | Carter | |

OTHER PUBLICATIONS

Cloud Brokering Architecture for Dynamic Placement of Virtual Machines Dheeraj Rane and Abhishek Srivastava (Year: 2015).*

On Architecture for SLA-aware Workflows in Grid Environments Dang Minh Quan and Odej Kao (Year: 2005).*

Towards an Adaptive Grid Scheduling: Architecture and Protocols Specification Inès Thabet, Chihab Hanachi, and Khaled Ghédira (Year: 2009).*

GEODIS: towards the optimization of data locality-aware job scheduling in geo-distributed data centers Moïse W. Convolbo, Jerry Chou, Ching-Hsien Hsu, Yeh Ching Chung (Year: 2017).*

OCPDA: A novel approach towards detection of overloaded cloud providers in a federated environment Benay Kumar Ray, Oindrilla Ghosh, Srimoyee Bhattacherjee, Sarbani Roy and Sunirmal Khatua (Year: 2018).*

Tong, Z., Deng, X., Chen, H. et al. QL-HEFT: a novel machine learning scheduling scheme base on cloud computing environment. Neural Comput & Applic 32, 5553-5570 (2020). https://doi.org/10.1007/s00521-019-04118-8.

Alexandru Iulian Orhean[a], Florin Pop*[a], Ioan Raicu[b] [a]Computer Science Department, Faculty of Automatic Control and Computers, University Politehnica of Bucharest, Romania[b]Department of Computer Science (CS), Illinois Institute of Technology (IIT). New Scheduling Approach using Reinforcement Learning for Heterogeneous Distributed Systems, 2017, Journal of Parallel and Distributed Computing.

Basel Magableh, School of Computer Science, Dublin Institute of Technology, Technological University Dublin, Ireland. A Deep Recurrent Q Network towards Self-adapting Distributed Microservices architecture. arXiv:1901.04011v2 [cs.SE] Jan. 15, 2019.

Debeer and Strobl BMC Bioinformatics. Conditional Permutation Importance Revisited. (2020) 21:307 https://doi.org/10.1186/s12859-020-03622-2.

Haoran Qiu, Subho S. Banerjee, Saurabh Jha, Zbigniew T. Kalbarczyk, and Ravishankar K. Iyer, University of Illinois at Urbana-Champaign. FIRM: An Intelligent Fine-grained Resource Management Framework for SLO-Oriented Microservices. Corpus ID 978-1-939133-19-9, 2020 14th Usenix Symposium on Operating Systems Design and Implementation, Nov. 4-6, 2022.

Huang, Huang, Chen, Wang, IEEE: Simulated Annealing for Sequential Pattern Detection and Seismic Applications, Dec. 2014 doi.org/10.1109/JSTARS.2014.2344756.

Lin, Li, Liao, Franke, Capacity Optimization for Resource Pooling in Virtualized Data Centers with Composable Systems, DOI 10.1109/TPDS.2017.2757479 (2017).

Muhammad Tirmazi, Adam Barker, Nan Deng, Md E. Haque, Zhi-jing Gene Qin, Steven Hand, MorHarchol-Balter, and John Wilkes. 2020. Borg: the Next Generation. In Fifteenth European Conference on Computer Systems (EuroSys 20), Apr. 27-30, 2020, Heraklion, Greece. ACM, New York, NY, USA, 14 pages. https://doi.org/10.1145/3342195.3387517.

Oren Ben-Kiki et al. "YAML Aint Markup Language (YAML) version 1.2"; Revision 1.2.2 (Oct. 1, 2021); <https://yaml.org> 66 pages.

Stoica, INRA-Biometrie, Gregori, University Jaume I, Mateu, University Jaume I: Simulated Annealing and Object Point Processes: Tools for Analysis of Spatial Patterns, Jul. 2005.

Yihui Feng, Alibaba Group; Zhi Liu, Yunjian Zhao, Tatiana Jin, and Yidi Wu, The Chinese University of Hong Kong; Yang Zhang, Alibaba Group; James Cheng, The Chinese University of Hong Kong; Chao Li and Tao Guan, Alibaba Group. Scaling Large Production Clusters with Partitioned Synchronization. Corpus ID 235344400. 2021 Usenix Annual Technical Conference, Jul. 14-16, 2021.

Elarbi Badidi et al., An Architecture for QoS-Aware Fog Service Provisioning, Year: 2020 (8 pages).

Farah Ait Salaht et al., An Overview of Service Placement Problem in Fog and Edge Computing, Year: 2020 (35 pages).

Abdulaziz Alhubaishy et al., The Best-Worst Method for Resource Allocation and Task Scheduling in Cloud Computing, 6 pages, Year: 2020.

Aref Abdullah et al., A reliable, TOPSIS-based multi-criteria, and hierarchical load balancing method for computational grid, 22 pages, Year: 2019.

Dang Minh Quan et al., On Architecture for SLA-aware Workflows in Grid Environments, 19 Pages, Year: 2005.

Ivan Roderoa et al., Grid broker selection strategies using aggregated resource information, 13 pages, Year: 2009.

S. M. Jaybhaye et al., Heterogeneous Resource Provisioning for Workflow-Based Applications Using AHP in Cloud Computing, Chapter 41, 15 pages, Year : 2021.

Attila Kertesz et al., GM BS: A new middleware service for making grids interoperable, GM BS: A new middleware service for making grids interoperable, Unknown, 1-12, 2009.

Benay Kumar Ray et al., OCPDA: A novel approach towards detection of overloaded cloud providers in a federated environment, OCPDA: A novel approach towards detection of overloaded cloud providers in a federated environment, Unknown, 1-6, 2018.

Stylianos Zikos et al., The Impact of Service Demand Variability on Resource Allocation Strategies in a Grid System, The Impact of Service Demand Variability on Resource Allocation Strategies in a Grid System, Unknown, 1-29, 2010.

* cited by examiner

METHOD AND SYSTEM FOR PROVISIONING APPLICATIONS IN A DISTRIBUTED MULTI-TIERED COMPUTING ENVIRONMENT

BACKGROUND

Computing devices often exist in complex ecosystems of devices in which data exists and/or is generated. Such data may be used and/or operated on to produce any number of results. Such operations are often performed by applications that include any number of services. It may be advantageous to provision all or portions of such applications within certain portions of the ecosystem of devices. However, as the complexity of such an ecosystem increases (e.g., more data, more devices, etc.), it may become difficult to determine where to provision applications, and how to efficiently do so once target domains are determined.

SUMMARY

In general, certain embodiments described herein relate to a method for managing a distributed multi-tiered computing (DMC) environment. The method may include obtaining, by a global controller, a DMC environment management request from a user; and in response to obtaining the request: making a first determination that the DMC environment management request is a create request, and the create request is associated with provisioning an application in the DMC environment; in response to the first determination: generating scheduling packages associated with target domains of the DMC environment based on the create request; sending the scheduling packages to local controllers associated with the target domains; obtaining application information from the local controllers; and providing the application information to the user.

In general, certain embodiments described herein relate to a non-transitory computer readable medium that includes computer readable program code, which when executed by a computer processor enables the computer processor to perform a method for managing a distributed multi-tiered computing (DMC) environment. The method may include obtaining, by a global controller, a DMC environment management request from a user; and in response to obtaining the request: making a first determination that the DMC environment management request is a create request, and the create request is associated with provisioning an application in the DMC environment; in response to the first determination: generating scheduling packages associated with target domains of the DMC environment based on the create request; sending the scheduling packages to local controllers associated with the target domains; obtaining application information from the local controllers; and providing the application information to the user.

In general, certain embodiments described herein relate to a system for managing a distributed multi-tiered computing (DMC) environment. The system may include a DMC environment. The system may also include a global controller of DMC environment, comprising a processor and memory, and includes the functionality to obtain a DMC environment management request from a user; and in response to obtaining the request: make a first determination that the DMC environment management request is a create request, and the create request is associated with provisioning an application in the DMC environment; in response to the first determination: generate scheduling packages associated with target domains of the DMC environment based on the create request; send the scheduling packages to local controllers associated with the target domains; obtain application information from the local controllers; and provide the application information to the user.

Other aspects of the embodiments disclosed herein will be apparent from the following description and the appended claims.

BRIEF DESCRIPTION OF DRAWINGS

Certain embodiments disclosed herein will be described with reference to the accompanying drawings. However, the accompanying drawings illustrate only certain aspects or implementations of the embodiments disclosed herein by way of example and are not meant to limit the scope of the claims.

DETAILED DESCRIPTION

Figure 1A:
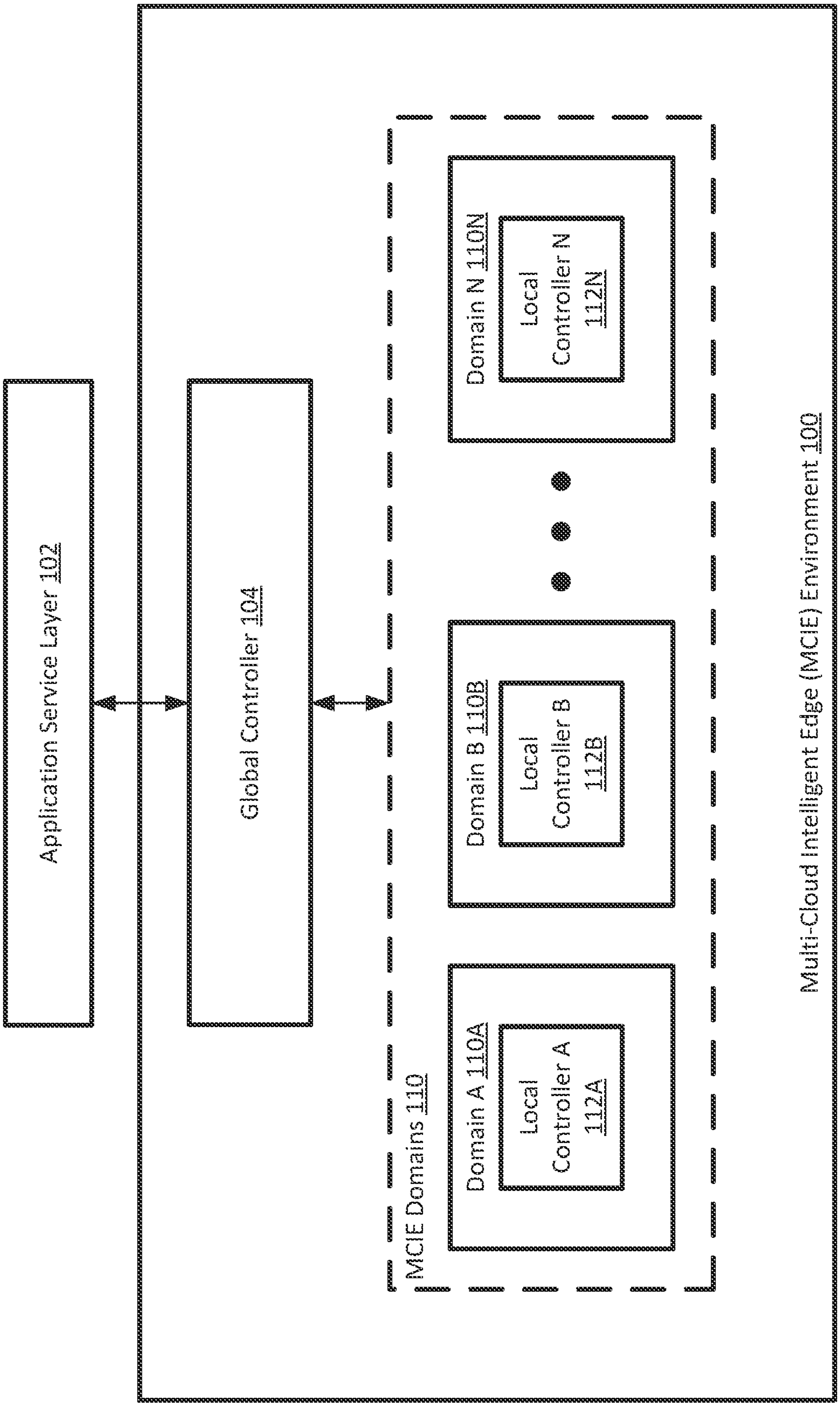
FIG. 1A shows a diagram of a system in accordance with one or more embodiments disclosed herein.

Specific embodiments will now be described with reference to the accompanying figures. In the following description, numerous details are set forth as examples of embodiments disclosed herein. It will be understood by those skilled in the art that one or more embodiments disclosed herein may be practiced without these specific details and that numerous variations or modifications may be possible without departing from the scope of the embodiments disclosed herein. Certain details known to those of ordinary skill in the art are omitted to avoid obscuring the description.

In the following description of the figures, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure and the number of elements of the second data structure may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms “before”, “after”, “single”, and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase ‘operatively connected’ may refer to any direct connection (e.g., wired directly between two devices or components) or indirect connection (e.g., wired and/or wireless connections between any number of devices or components connecting the operatively connected devices). Thus, any path through which information may travel may be considered an operative connection.

As used herein, an entity that is programmed to and/or configured to perform a function (e.g., step, action, etc.) refers to one or more hardware devices (e.g., processors, digital signal processors, field programmable gate arrays, application specific integrated circuits, etc.) that provide the function. The hardware devices may be programmed to do so by, for example, being able to execute computer instructions (e.g., computer code) that cause the hardware devices to provide the function. In another example, the hardware device may be programmed to do so by having circuitry that has been adapted (e.g., modified) to perform the function. An entity that is programmed to perform a function does not include computer instructions in isolation from any hardware devices. Computer instructions may be used to program a hardware device that, when programmed, provides the function.

In general, embodiments described herein relate to methods, systems, and non-transitory computer readable mediums storing instructions for performing global level provisioning of applications, or portions thereof, in a distributed multi-tiered computing ecosystem.

In one or more embodiments, as computing environments grow in size and complexity (e.g., from multi-cloud to multi-core to multi-edge domains of a distributed multi-tiered computing environment), connecting more diverse devices generating more data, the need to be able to efficiently provision applications in such environments is required in order to support complex workflows. In one or more embodiments, as the overall application workflow extends within an environment to capture, process, analyze, or otherwise use data, fitting the services of the application workflow to the capabilities and capacities of the various portions of the distributed multi-tiered computing environment is required. Such fitting may allow for meeting the service level agreement (SLA) and/or service level objectives (SLOs) for the application workflow and the services used in building the workflow, which may be achieved by provisioning work to portions of the distributed mule-tiered computing environment having necessary capabilities, capacity, and/or data. In one or more embodiments, such a complex distributed multi-tiered computing environment may also be required to service large quantities of requests to provision applications.

Based on the large quantity and a high frequency of application provisioning requests and the large quantity and increased complexity of the domains included in the distributed multi-tiered computing environment, the distributed multi-tiered computing environment may include a management hierarchy. In one or more embodiments, the management hierarchy includes global level management, domain level management, and device level management. In one or more embodiments, global level management services may be performed by a global controller, domain level management services may be performed by local controllers associated with the domains of the distributed multi-tiered computing environment, and the device level management services may be performed by endpoint controllers associated with devices included in the domains of the distributed multi-tiered computing environments. In one or more embodiments, instructions and/or data may be passed between the global controller, local controllers, and the endpoint controllers to perform the global level management services, domain level management services, and the device level management services, respectively. As a result, by dispersing the management functionality of the distributed multi-tiered computing environment into three levels (i.e., global level, domain level, and device level), the efficiency, performance, and scalability of the distributed multi-tiered computing environment may be improved.

In one or more embodiments, as part of the aforementioned global level management services, the global controller may service the requests to provision applications within the distributed multi-tiered computing environment by performing global level application provisioning services. In one or more embodiments, the global level application provisioning services may include scheduling applications, or portions thereof, to one or more domains included in the distributed multi-tiered computing environment based on SLA, SLOs, and/or other criteria specified in a manifest included in the application provisioning request. Additionally, scheduling applications may include generating scheduling packages that include, at least in part, requirements, criteria and/or instructions for performing domain level scheduling of the application, or portion thereof, associated with the scheduling packages. In one or more embodiments, the global controller provides the scheduling packages to local controllers associated with domains of the distributed multi-tiered computing environment. Accordingly, the local controllers use the scheduling packages to perform domain level scheduling to provision applications, or portions thereof, within domains of the distributed multi-tiered computing environment.

FIG. 1A shows a diagram of a system in accordance with one or more embodiments described herein. The system may include an application service layer (102) and a distributed multi-tiered computing environment. The distributed multi-tiered computing environment may be referred to as a multi-cloud intelligent edge (MCIE) environment (100) throughout this Detailed Disclosure. The MCIE environment (100) may include a global controller (104) and MCIE domains (110). The MCIE domains (110) may include any quantity of MCIE domains (110) without departing from embodiments disclosed herein. For example, the MCIE domains (110) may include domain A (110A), domain B (110B) and domain N (110N). Each domain may include (or be operatively connected to) a local controller. For example, domain A (110A) may include (or be operatively connected to) local controller A (112A), domain B (110B) may include (or be operatively connected to) local controller B (112B), and domain N (110N) may include (or be operatively connected to) local controller N (112N). All or any portion of any device or set of devices in the system illustrated in FIG. 1A may be operatively connected to any other device or set of devices via any combinations of wireless (e.g., WAN) and/or wired connections (e.g., Ethernet) referred to as a one or more networks. Each of these components is described below.

In one or more embodiments disclosed herein, the application service layer (102) includes the functionality to provide requests and manifests for provisioning applications in the MCIE environment (100). The application service layer (102) may be used by one or more users (e.g., customers of the MCIE environment (100), system administrators of the MCIE environment (100), etc.) to submit requests and manifests to the global controller (104) to provision applications in the MCIE environment (100). The application service layer (102) may also include the functionality to enable users to generate, configure, and/or modify requests and/or manifests through, for example, a graphical user interface. The application service layer (102) may include other and/or additional types of user interfaces without departing from embodiments disclosed herein.

The application service layer (102) may further include the functionality to provide and/or obtain additional information to and from the global controller (104). The additional information may include, for example, binary program files for applications, configuration files, communication information (e.g., user identifiers, network addresses, URLs, etc.), security information (e.g., encryption keys, digital signatures, certificates, etc.), and other and/or additional information that may be used by the global controller (104) to provision applications and/or establish communications between users and the global controller (104) without departing from embodiments disclosed herein. The application service layer (102) may include other and/or additional functionalities without departing from embodiments disclosed herein.

In one or more embodiments disclosed herein, the application service layer (102) is implemented using one or more computing devices. For additional details regarding computing devices, refer to FIG. 2 and FIG. 6.

In one or more embodiments disclosed herein, the application service layer (102) is implemented as a logical device. A logical device may utilize the computing resources of any number of computing devices and thereby provide the functionality of the application service layer (102) described throughout this application.

In one or more embodiments disclosed herein, the global controller (104) includes the functionality to perform global level management services for the MCIE environment (100). The global level management services may include global scheduling services. The global scheduling services may include: (i) obtaining requests and manifests from users of the application service layer (102), (ii) performing global provisioning of applications to one or more domains (e.g., 110A, 110B) of the MCIE environment (100), (iii) providing and/or obtaining information to/from local controllers (e.g., 112A, 112B) of MCIE domains (e.g., 110A, 110B), and (iv) providing and/or obtaining information to/from users of the application service layer (102). For additional information regarding the performance of global scheduling services, refer to FIGS. 4A-5.

The global scheduling services may further include scheduling policy selection services. In one or more embodiments disclosed herein, the scheduling policies are one or more data structures that include scheduling requirements, objectives, and/or criteria that may be used by local controllers to perform domain level scheduling. Additionally, the global controller (104) may further include the functionality to assign priorities to each scheduling policy selected in a scheduling package.

In one or more embodiments disclosed herein, the scheduling policies include one or more data structures that include scheduling requirements to be used by local controllers to perform domain level scheduling services. The requirements may include makespan minimization, scheduling efficiency, resource utilization, and resource cost. The scheduling policies may include other and/or additional scheduling requirements without departing from embodiments disclosed herein.

In one or more embodiments disclosed herein, makespan minimization refers to minimizing the time that it takes to perform a domain level scheduling job. In other words, makespan minimization refers to minimizing the time that an application responds to a request as measured from the first service in the execution path to the last service.

In one or more embodiments disclosed herein, scheduling efficiency refers to minimizing the time between obtaining an application provisioning request and completing the scheduling of the application associated with the provisioning request.

In one or more embodiments disclosed herein, resource utilization may refer to maximizing resource utilization when scheduling application tasks to resources (e.g., compute resources, domain specific accelerator resources, memory resources, networking resources, storage resources, etc.) of domains.

In one or more embodiments disclosed herein, resource cost may refer to minimizing the resource cost of provisioning applications to target domains and/or devices. In other words, application tasks may be assigned to resources that computationally cost less than other resources of the domains, thereby indirectly resulting in a reduction of monetary cost to the user.

Returning to the discussion of the global scheduling services, the global scheduling services may further include generating scheduling packages using case based reasoning. Case based reasoning may include obtaining fingerprints of previously provisioned applications, or portions thereof, and identifying target domains for applications, or portions thereof, based on the fingerprints. A fingerprint may include an aggregation of scheduling information and performance metrics associated with a previously provisioned application or service. The global controller (104) may analyze the fingerprints to: (i) identify previous target domains and/or scheduling packages associated with fingerprints of previously provisioned applications or services for use in assigning new applications associated with the fingerprints, and/or (ii) determine whether any additional criteria should be used when identifying target domains or generating scheduling packages for new applications associated with fingerprints.

In one or more embodiments disclosed herein, in addition to the global scheduling services, the global level management services also includes global lifecycle services.

In one or more embodiments disclosed herein, the global controller (104) may further include the functionality to perform load management services of the global lifecycle services. The load management services may include generating load management predictions that specify short term, medium term, and long term future loads of the global controller (104), the MCIE domains (110), the local controllers (e.g., 112A, 112B, 112N), and the devices of the MCIE domains (110). The global controller (104) may initiate adjustment of future scheduling policies for the global controller (104) and local controllers (e.g., 112A, 112B, 112N) based on the load management predictions. The global controller (104) may also adjust the number of local scheduler instances of local controllers (e.g., 112A, 112B, 112N) and the infrastructure capacity of MCIE domains (110) of the MCIE environment (100).

In one or more embodiments disclosed herein, the lifecycle management services further include global resource buffer management services. The global resource buffer management services may include generating updated resource buffers for different types of devices and/or MCIE domains (110). The global controller (104) may include the functionality to periodically generate resource buffers for MCIE domains (110) using device capacity information, device configuration information, and a power law resource buffer generation algorithm. The global controller (104) may use other and/or additional algorithms to generate resource buffers without departing from embodiments disclosed herein. The global controller (104) may provide updated resource buffers to local controllers (e.g., 112A, 112B, 112N) of MCIE domains (110).

The global controller (104) may include other and/or additional functionalities without departing from embodiments disclosed herein.

In one or more embodiments disclosed herein, the global controller (104) is implemented using one or more computing devices. For additional details regarding computing devices, refer to FIG. 2 and FIG. 6.

In one or more embodiments disclosed herein, the global controller (104) is implemented as a logical device. A logical device may utilize the computing resources of any number of computing devices and thereby provide the functionality of the global controller (104) described throughout this application.

In one or more embodiments disclosed herein, the MCIE domains (110) include the functionality to execute all and/or portions of applications. The execution of the application may provide computer implemented services for users of the system. The computer implemented services may include any combination of inferencing, data analytics, computer vision, database management, etc. The computer implemented services may include other and/or additional types of computer implemented services without departing from embodiments disclosed herein.

An application may include one or more services (also referred to throughout this Detailed Disclosure as tasks or application tasks). Each service may provide a portion of the functionality of the application. The services may include, for example, data collection services, data transformation services, data processing services, monitoring services, etc. The services may include other and/or additional types of services without departing from embodiments disclosed herein. An application may include any quantity of service instances associated with each service of the application without departing from embodiments disclosed herein.

In one or more embodiments disclosed herein, each MCIE domain (e.g., 110A, 110B, 110N) of the MCIE domains (110) is implemented as one or more computing devices. For additional details regarding computing devices, refer to FIG. 2 and FIG. 6. For additional information regarding MCIE domains (110), refer to FIG. 2.

In one or more embodiments disclosed herein, the MCIE domains (110) are implemented as logical devices. A logical device may utilize the computing resources of any number of computing devices and thereby provide the functionality of the MCIE domains (110) described throughout this application. For additional information regarding MCIE domains (110), refer to FIG. 2.

In one or more embodiments disclosed herein, the local controllers (e.g., 112A, 112B, 112N) include the functionality to perform domain level management services. The domain level scheduling services may include: (i) obtaining scheduling packages and scheduling requests from the global controller (104), (ii) assigning services (or tasks) of applications to devices included in domain associated with the local controller, (iii) providing application access information (discussed below) to the global controller (104), and (iv) providing domain information (discussed below) to the global controller (104). The local controllers (e.g., 112A, 112B, 112N) may include other and/or additional functionalities without departing from the embodiments disclosed herein. For additional information regarding local controllers (e.g., 112A, 112B, 112N), refer to FIG. 1B.

In one or more embodiments disclosed herein, the local controllers (e.g., 112A, 112B, 112N) are implemented as one or more computing devices. For additional details regarding computing devices, refer to FIG. 2 and FIG. 6.

In one or more embodiments disclosed herein, the local controllers (e.g., 112A, 112B, 112N) are implemented as logical devices. A logical device may utilize the computing resources of any number of computing devices and thereby provide the functionality of the local controllers (e.g., 112A, 112B, 112N) described throughout this application.

While FIG. 1A shows a configuration of certain components, other configurations and/or other components may be used without departing from the scope of embodiments described herein. Accordingly, embodiments disclosed herein should not be limited to the configuration of components shown in FIG. 1A.

Figure 1B:
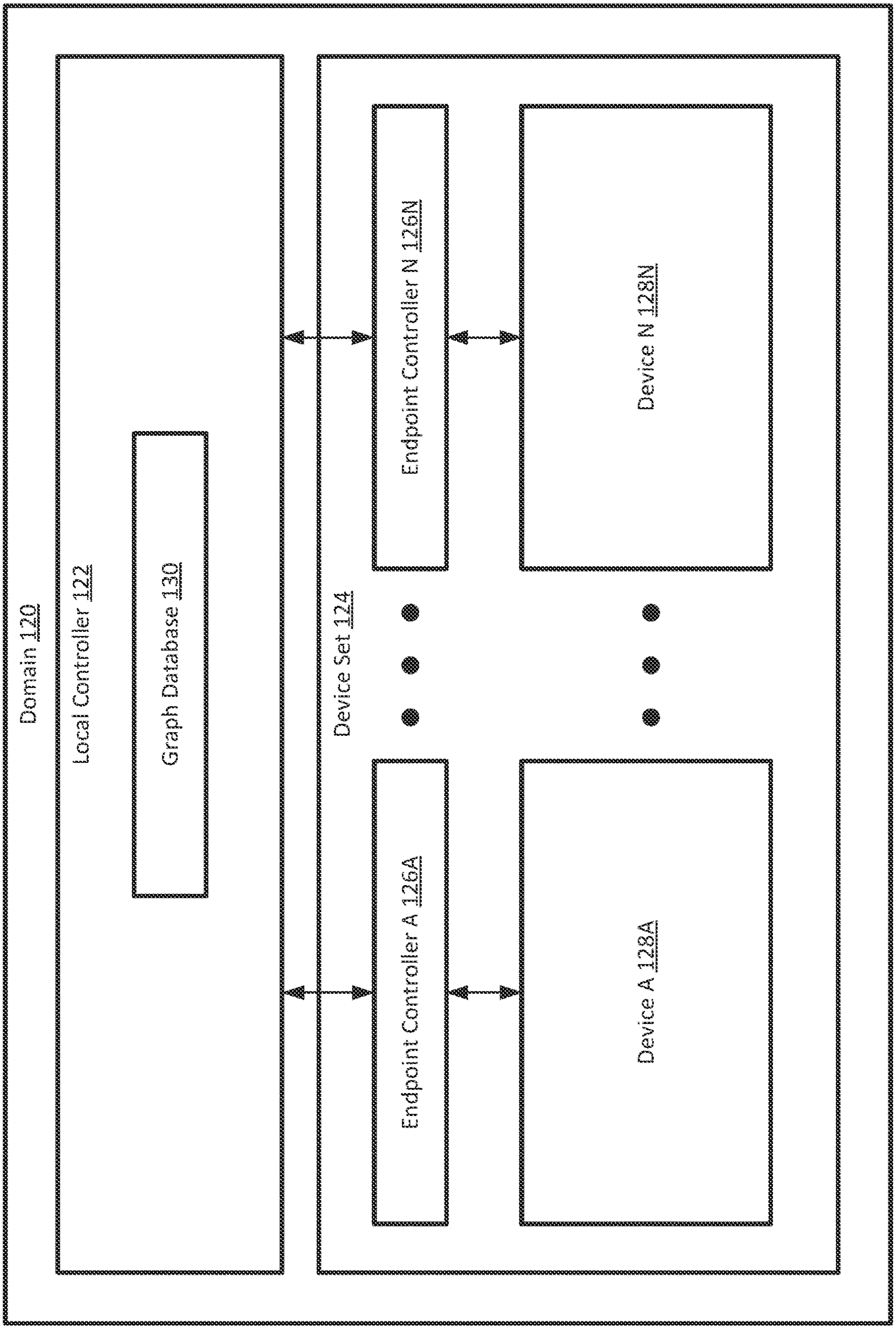
FIG. 1B shows a diagram of a domain in accordance with one or more embodiments disclosed herein.

FIG. 1B shows a diagram of a domain in accordance with one or more embodiments disclosed herein. The domain (120) may be an embodiment of the MCIE domains (110) (e.g., domain A (110A), domain B (110B), and domain N (110N)) discussed above with regard to FIG. 1A. As discussed above, the domain (120) may include the functionality to execute all and/or portions of applications. To provide the aforementioned functionality, the domain (120) includes a local controller (122) and a device set (124). Each of the aforementioned components is discussed below.

The local controller (122) may be an embodiment of the local controllers (e.g., 112A, 112B, 112N) discussed above with regard to FIG. 1A. As discussed above, the local controller (122) may include the functionality to perform domain level scheduling services for the domain (120). The local controller may further include the functionality to perform domain level scheduling services using constraint management scheduling, heuristic scheduling, and/or reinforcement learning scheduling. Moreover, as part of performing the domain level scheduling services, the local controller (122) may use and/or maintain a graph database (130).

In one or more embodiments disclosed herein, the graph database (130) is implemented as one or more data structures that include domain information. The domain information may specify devices included in the device set (124) of the domain (120) (e.g., include device identifiers associated with the devices). The domain information may further specify the capability and the capacity of the devices of the device set (124). The domain information may include resource units associated with each device in the device set that specify the capability of the corresponding device. The resource units may include compute units (e.g., quantity of processors and/or processor cores), memory units (e.g., size of total memory capacity), network units (e.g., quantity network interface cards (NICs), and/or total network bandwidth), and accelerator units (e.g., quantity of graphics processing units (GPUs) and/or quantity of GPU memory, field programmable gate arrays (FPGAs) and/or quantity of FPGA logic elements, etc.) associated with each device of the device set (124). The resource units may include other and/or additional information regarding the capability (e.g., storage units associated with a total quantity of data storage capacity) of the devices in the device set (124) without departing from embodiments disclosed herein.

In one or more embodiments disclosed herein, the resource units may be normalized using a reference device. For example, the reference device may include 100 CPU cores, 32 gigabytes of memory for RAM, 40 gigabytes of memory for a GPU, and 10 gigabytes per second of network bandwidth. A device (e.g., 128A) of the device set (124) for the domain (120) may include 48 CPU cores, 16 gigabytes of memory for RAM, two 40 gigabyte GPUs, and two 10 gigabytes per second NICs. The normalized resource units associated with the device would include 0.48 normalized compute units, 0.5 normalized memory units, 2.0 normalized accelerator units, and 2.0 normalized network units.

In one or more embodiments disclosed herein, the resource units, or a portion thereof, may also be normalized based on relative performance. For example, a first processor may be an older generation compared to a second processor, and therefore may only be able to perform 80 percent of the cycles per second compared to that of the second processor. If a first device includes 100 cores of the first processor and a second device include 100 cores of the second processor, then the first device may include 0.8 normalized compute units and the second device may include 1.0 normalized compute units assuming that the processor included in the reference system includes the same performance as that of the second device.

Continuing with the discussion of the domain information, the domain information may further specify portions of the normalized resource units (e.g., percentages of the normalized resource units) associated with the device that are available for provisioning and that are provisioned to execute existing application and/or services. The domain information may further specify the applications, or portions thereof, (e.g., services) that are executing on each device included in the device set (124) (e.g., include application identifiers and/or service identifiers associated with each device). The domain information may be generated and/or obtained by the local controller (122). The local controller (122) may include the domain information in the graph database (130). The local controller (122) may update the graph database over time. The graph database (130) may include other and/or additional information associated with the domain (120) without departing from embodiments disclosed herein.

The graph database (130) may be stored in storage of the local controller (122). The storage may be implemented using physical devices that provide data storage services (e.g., storing data and providing copies of previously stored data). The devices that provide data storage services may include hardware devices and/or logical devices. For example, the storage may include any quantity and/or combination of memory devices (i.e., volatile storage), long term storage devices (i.e., persistent storage), other types of hardware devices that may provide short term and/or long term data storage services, and/or logical storage devices (e.g., virtual persistent storage/virtual volatile storage).

The storage may also be implemented using logical storage. A logical storage (e.g., virtual disk) may be implemented using one or more physical storage devices whose storage resources (all, or a portion) are allocated for use using a software layer. Thus, a logical storage may include both physical storage devices and an entity executing on a processor or other hardware device that allocates the storage resources of the physical storage devices.

While discussed above as being stored in storage of the local controller (122), the graph database may be stored in one or more storages of the domain (120) (e.g., storages included in the device set (124)), and/or stored in a distributed or otherwise shared storage accessible by the global controller (104, FIG. 1A) and local controllers (e.g., 112A, 112B, 112N, FIG. 1A) using any appropriate method of distributed data storage (e.g., network file system, peer-to-peer storage network, etc.) without departing from embodiments disclosed herein.

In one or more embodiments disclosed herein, in addition to the domain scheduling services, the domain level management services also includes domain lifecycle services.

In one or more embodiments disclosed herein, the local controller (122) includes the functionality to perform the domain lifecycle services. The domain lifecycle services may include performing anomaly detection, performing service impairment root cause analysis, and performing service impairment remediation.

The local controller (122) may include other and/or additional functionalities without departing from embodiments disclosed herein.

In one or more embodiments disclosed herein, the device set (124) includes one or more endpoint controllers and one or more devices. For example, the device may include endpoint controller A (126A), endpoint controller N (126N), device A (128A), and device N (128N). Each device (e.g., 128A) may include and/or otherwise be operatively connected to an endpoint controller (e.g., 126A).

In one or more embodiments disclosed herein, an endpoint controller includes the functionality to perform device level management services for a corresponding device. For example, endpoint controller A (126A) may perform device level management services for device A (128A) and endpoint controller N (126N) may perform device level management services for device N (128N).

In one or more embodiments disclosed herein, the device level management services include device level scheduling services. The device level scheduling services may include: (i) obtaining provisioning commands and scheduling assignments from the local controller (122), (ii) performing the provisioning commands and using the scheduling assignments to instantiate applications and/or services on the corresponding device, (iii) setting up monitoring services associated with the device, and (iv) sending configuration confirmations and monitoring information to the local controller (122). The device level scheduling services may include other and/or additional services without departing from embodiments disclosed herein.

In one or more embodiments disclosed herein, the device level management services further includes device lifecycle services. The device lifecycle services may include resource buffer management services. The resource buffer management services may include (i) obtaining resource buffers from the local controller (122), (ii) maintaining resource buffers associated with the device, monitoring device metrics to determine whether the resource buffer should be adjusted, (iii) updating resource buffers based on newly obtained resource buffers and/or the device metrics. The resource buffer management services may include other and/or additional services without departing from embodiments disclosed herein.

The endpoint controllers (e.g., 126A, 126N) may include other and/or additional functionalities without departing from embodiments disclosed herein.

In one or more embodiments disclosed herein, the endpoint controllers (e.g., 126A, 126N) are implemented as one or more computing devices. A computing device may be an embodiment of the computing devices discussed above and with respect to FIG. 6.

In one or more embodiments disclosed herein, the endpoint controllers (e.g., 126A, 126N) are implemented as logical devices. A logical device may utilize the computing resources of any number of computing devices and thereby provide the functionality of the endpoint controllers (e.g., 126A, 126N) described throughout this application.

In one or more embodiments disclosed herein, the endpoint controllers (e.g., 126A, 126N) are implemented as physical devices of the device set. A physical device may include circuitry. The physical device may be, for example, a field-programmable gate array, application specific integrated circuit, programmable processor, microcontroller, digital signal processor, or other hardware processor. The physical device may be configured to provide the functionality of the endpoint controllers (e.g., 126A, 126N) described throughout this Detailed Description.

In one or more embodiments disclosed herein, the endpoint controllers (e.g., 126A, 126N) are implemented as computer instructions, e.g., computer code, stored on a persistent storage that when executed by a processor of the device set (124) causes the device set (124) to provide the functionality of the endpoint controllers (e.g., 126A, 126N) described throughout this Detailed Description.

In one or more embodiments disclosed herein, the devices (e.g., 128A, 128N) include the functionality to execute applications and/or services to provide the aforementioned functionality of the domain (120) (e.g., to provide computer implemented services to users). The devices (e.g., 128A, 128N) may include other and/or additional functionalities without departing from embodiments disclosed herein.

In one or more embodiments disclosed herein, a device (e.g., 128A) is implemented as a computing device. In one or more embodiments, a computing device is any device, portion of a device, or any set of devices capable of electronically processing instructions and may include any number of components, which include, but are not limited to, any of the following: one or more processors (e.g., components that include integrated circuitry) (not shown), memory (e.g., random access memory (RAM)) (not shown), input and output device(s) (not shown), non-volatile storage hardware (e.g., solid-state drives (SSDs), hard disk drives (HDDs) (not shown)), one or more physical interfaces (e.g., network ports, storage ports) (not shown), any number of other hardware components (not shown), accelerators (e.g., GPUs) (not shown), sensors for obtaining data, and/or any combination thereof.

Examples of computing devices include, but are not limited to, a server (e.g., a blade-server in a blade-server chassis, a rack server in a rack, etc.), a desktop computer, a mobile device (e.g., laptop computer, smart phone, personal digital assistant, tablet computer, automobile computing system, and/or any other mobile computing device), a storage device (e.g., a disk drive array, a fibre/fiber channel storage device, an Internet Small Computer Systems Interface (iSCSI) storage device, a tape storage device, a flash storage array, a network attached storage device, etc.), a network device (e.g., switch, router, multi-layer switch, etc.), a hyperconverged infrastructure, a cluster, a virtual machine, a logical container (e.g., for one or more applications), and/or any other type of device with the aforementioned requirements.

In one or more embodiments, any or all of the aforementioned examples may be combined to create a system of such devices (e.g., the device set (124)). Other types of computing devices may be used without departing from the scope of the embodiments described herein.

In one or more embodiments, the non-volatile storage (not shown) and/or memory (not shown) of a computing device or system of computing devices may be one or more data repositories for storing any number of data structures storing any amount of data (i.e., information). In one or more embodiments, a data repository is any type of storage unit and/or device (e.g., a file system, database, collection of tables, RAM, and/or any other storage mechanism or medium) for storing data. Further, the data repository may include multiple different storage units and/or devices. The multiple different storage units and/or devices may or may not be of the same type or located at the same physical location.

In one or more embodiments, any non-volatile storage (not shown) and/or memory (not shown) of a computing device or system of computing devices may be considered, in whole or in part, as non-transitory computer readable mediums, which may store software and/or firmware.

Such software and/or firmware may include instructions which, when executed by the one or more processors (not shown) or other hardware (e.g., circuitry) of a computing device and/or system of computing devices, cause the one or more processors and/or other hardware components to perform operations in accordance with one or more embodiments described herein.

The software instructions may be in the form of computer readable program code to perform, when executed, methods of embodiments as described herein, and may, as an example, be stored, in whole or in part, temporarily or permanently, on a non-transitory computer readable medium such as a compact disc (CD), digital versatile disc (DVD), storage device, diskette, tape storage, flash storage, physical memory, or any other non-transitory computer readable medium. As discussed above, embodiments disclosed herein may be implemented using computing devices.

In one or more embodiments, such computing devices may be operatively connected to other computing devices of the device set (124) in any way, thereby creating any topology of computing devices within the device set (124). In one or more embodiments, one or more computing devices in the device set (124) may be operatively connected to any one or more devices in any other domain of the MCIE environment (100, FIG. 1A). Such operative connections may be all or part of a network as discussed above. A network may refer to an entire network or any portion thereof (e.g., a logical portion of the devices within a topology of devices). A network may include a data center network, a wide area network, a local area network, a wireless network, a cellular phone network, and/or any other suitable network that facilitates the exchange of information from one part of the network to another. A network may be located at a single physical location, or be distributed at any number of physical sites. In one or more embodiments, a network may be coupled with or overlap, at least in part, with the Internet.

The network may include any number of devices within any domain (e.g., 110A, 110B, 110N, FIG. 1A) of the MCIE environment (100), as well as devices external to, or between, such portions of MCIE environment (100). In one or more embodiments, at least a portion of such devices are network devices (not shown). In one or more embodiments, a network device is a device that includes and/or is operatively connected to persistent storage (not shown), memory (e.g., random access memory (RAM)) (not shown), one or more processor(s) (e.g., integrated circuits) (not shown), and at least two physical network interfaces, which may provide connections (i.e., links) to other devices (e.g., computing devices, other network devices, etc.). In one or more embodiments, a network device also includes any number of additional components (not shown), such as, for example, network chips, field programmable gate arrays (FPGAs), application specific integrated circuits (ASICs), indicator lights (not shown), fans (not shown), etc. A network device may include any other components without departing from the scope of embodiments described herein. Examples of a network device include, but are not limited to, a network switch, a router, a multilayer switch, a fibre channel device, an InfiniBand® device, etc. A network device is not limited to the aforementioned specific examples.

In one or more embodiments, a network device includes functionality to receive network traffic data units (e.g., frames, packets, tunneling protocol frames, etc.) at any of the network interfaces (i.e., ports) of a network device and to process the network traffic data units. In one or more embodiments, processing a network traffic data unit includes, but is not limited to, a series of one or more lookups (e.g., longest prefix match (LPM) lookups, forwarding equivalence class (FEC) lookups, etc.) and corresponding actions (e.g., forward from a certain egress port, add a labeling protocol header, rewrite a destination address, encapsulate, etc.). Examples of network traffic data unit processing include, but are not limited to, performing a lookup to determine: (i) whether to take a security action (e.g., drop the network traffic data unit); (ii) whether to mirror the network traffic data unit; and/or (iii) how to route/forward the network traffic data unit in order to transmit the network traffic data unit from an interface of the network device. In one or more embodiments, network devices are configured to participate in one or more network protocols, which may include discovery schemes by which a given network device may obtain information about all or any of the network topology in which the network device exists. Such discovery schemes may include sharing of information between network devices, and may also include providing information to other devices within MCIE environment (100), such as, for example, local controllers and/or endpoint controllers (discussed above).

In one or more embodiments, any or all of the devices in the device set (124) may form one or more virtualization environments (not shown). In one or more embodiments, a virtualization environment is any environment in which any number of computing devices are subject, at least in part, to a shared scheme pooling compute resources for use in deploying virtualized computing device instances (e.g., VMs, containers, emulators, etc.), which may be used in any arrangement to perform all or any portion of any work requested within a domain.

While only illustrated as including a limited number of components, the domain may include other and/or additional components without departing from embodiments disclosed herein.

Figure 2:
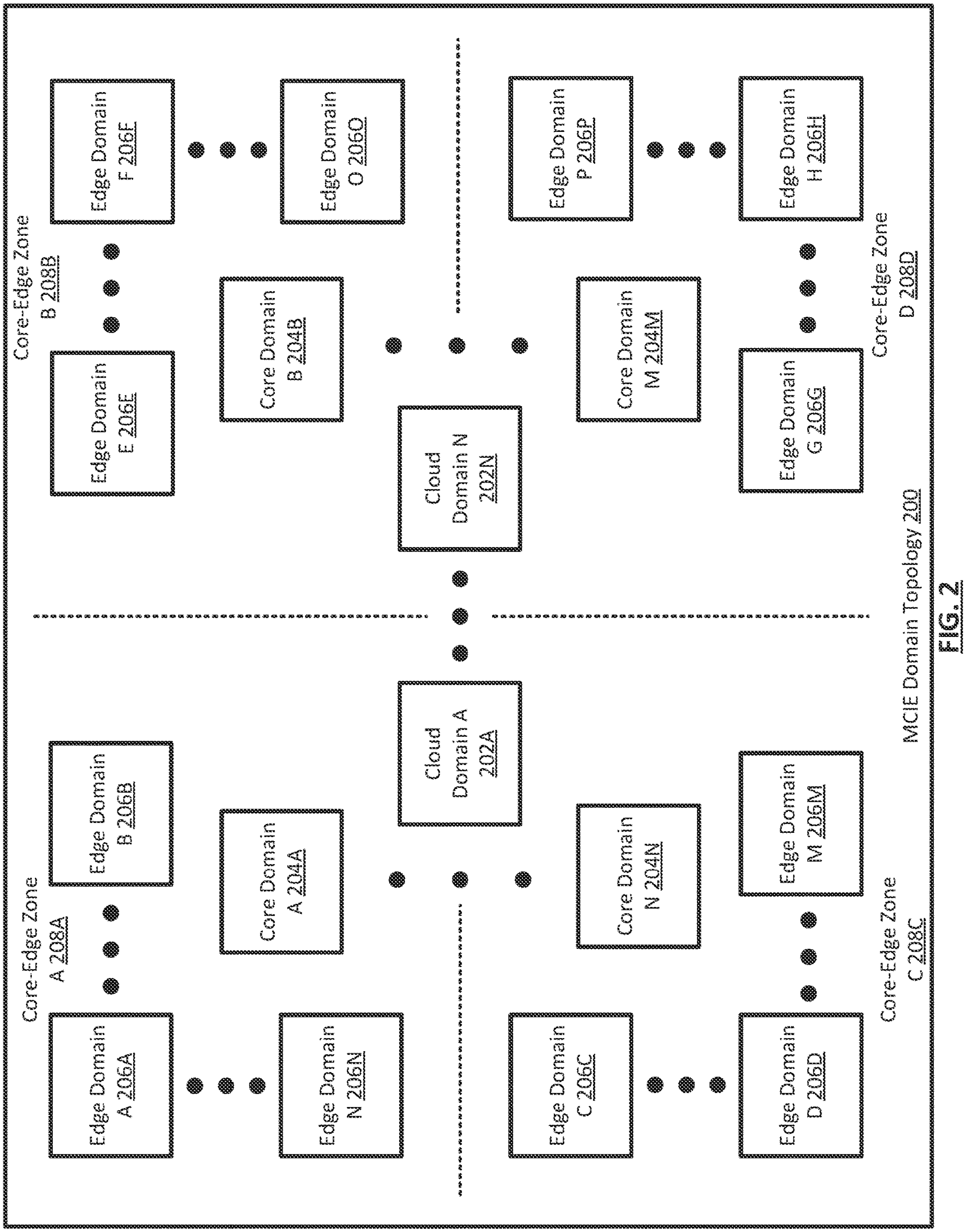
FIG. 2 shows a diagram of an MCIE domain topology in accordance with one or more embodiments disclosed herein.

FIG. 2 shows a diagram of a MCIE domain topology in accordance with one or more embodiments disclosed herein. As discussed above, the MCIE domains (110, FIG. 1A) may include any quantity of domains without departing from the embodiments disclosed herein. In one or more embodiments, MCIE domains (110, FIG. 1A) may be considered a hierarchy of domains. In the example embodiment shown in FIG. 2, the MCIE domain topology (200) includes edge domains, core domains, and cloud domains. The MCIE domain topology (200) may include cloud domains such as cloud domain A (202A), and cloud domain N (202N). The MCIE domain topology (200) may also include core domains such as core domain A (204A), core domain B (204B), core domain M (204M), and core domain N (204N). The MCIE domain topology (200) may further include edge domains such as edge domain A (206A), edge domain B (206B), edge domain C (206C), edge domain D (206D), edge domain E (206E), edge domain F (206F), edge domain G (206G), edge domain H (206H), edge domain M (206M), edge domain N (206N), edge domain O (2060), and edge domain P (206P).

The MCIE domain topology (200) is not limited to the exemplary arrangement shown in FIG. 2. The MCIE domain topology (200) may have any number of edge domains, which may be operatively connected to any number of core domains, which may, in turn, be operatively connected to one or more cloud domains. Additionally, a given MCIE domain topology (200) may have more or less layers without departing from the scope of embodiments described herein. For example, an edge domain may be operatively connected to a cloud domain without an intervening core domain. As another example, there may be only edge domains and core domains in the MCIE domain topology (200). One of ordinary skill in the art will recognize that there are many possible arrangements of the MCIE domain topology (200) other than the example topology shown in FIG. 2.

In one or more embodiments disclosed herein, each domain in the MCIE domain topology (200) includes a device set as discussed above in the description of the domain in FIG. 1B. In one or more embodiments, each device set is a set of computing devices, such as is discussed above in the description of device set A. However, the set of computing devices in different device sets may be different, and may be particular to the type of domain (e.g., edge, cloud, core) of the MCIE domain topology (200) that the device set is in. For example, an edge domain (e.g., 206A) of MCIE domain topology (200) may include sensors collecting data, controllers controlling the sensors, desktop devices, mobile computing devices, etc. Other domains may include different computing devices. For example, a core domain (e.g., 204A) of the MCIE domain topology (200) may include more powerful (e.g., having more compute resources) devices, a greater quantity of more powerful devices, specific architectures of sets of devices for performing certain tasks, etc. Also similarly, a cloud domain of the MCIE domain topology (200) may include still more and different devices configured and deployed in different ways than the other types of domains of the MCIE domain topology (200).

Additionally, the MCIE domain topology (200) may be arranged in a hierarchy. For example, a single cloud domain (e.g., 202A) may be operatively connected to any number of core domains (e.g., 204A), and each of which may be operatively connected to any number of edge domains (e.g., 206A, 206B, 206N). The particular device set in any given domain of the MCIE domain topology (200) may determine what capabilities the domain in which the device set exists is suited to perform, which is known to and/or determined by the local controllers for the domains (e.g., 112A, 112B, 112N, FIG. 1A).

Moreover, the MCIE domain topology (200) may be arranged based on geographical locations and/or geographical regions. In other words, a cloud domain (e.g., 202A) may include a device set that is associated with and/or physically spans a geographical region. A core domain (e.g., 204A) operatively connected to the cloud domain (e.g., 202A) may include a device set that is associated with and/or physically spans a portion of the geographical region associated with the cloud domain (e.g., 202A). An edge domain (e.g., 206A) operatively connected to the core domain (e.g., 204A) may include a device set that is associated with and/or physically spans a particular location within the portion of the geographical region associated with the core domain (e.g., 204A). As a simple example, a cloud domain (e.g., 202A) may be associated with the entirety of North America, a core domain (e.g., 204A) operatively connected to the cloud domain (e.g., 202A) may be associated with the United States of America, and an edge domain (e.g., 206A) may be associated with a warehouse located in New York City, New York.

Portions of the geographical regions associated with the cloud domains that include a core domain and one or more edge domains may be referred to as core-edge zones. The MCIE domain topology (200) may include core-edge zones such as core-edge zone A (208A), core-edge zone B (208B), core-edge zone C (208C), and core-edge zone D (208D). Core-edge zone A (208A) may include core domain A (204A), which may be operatively connected to edge domain A (206A), edge domain B (206B), and edge domain N (206N). Core-edge zone B (208B) may include core domain B (204B), which may be operatively connected to edge domain E (206E), edge domain F (206F), and edge domain O (2060). Core-edge zone C (208C) may include core domain N (204N), which may be operatively connected to edge domain C (206C), edge domain D (206D), and edge domain M (206M). Finally, core-edge zone D (208D) may include core domain M (204M), which may be operatively connected to edge domain G (206G), edge domain H (206H), and edge domain P (206P). The MCIE domain topology (200) may be arranged based on other and/or additional types of logical divisions (e.g., divisions within a company, types of devices included in device sets of domains, etc.) of domains without departing from embodiments disclosed herein.

While FIG. 2 shows a configuration of components, other configurations may be used without departing from the scope of embodiments described herein. Accordingly, embodiments disclosed herein should not be limited to the configuration of components shown in FIG. 2.

Figure 3:
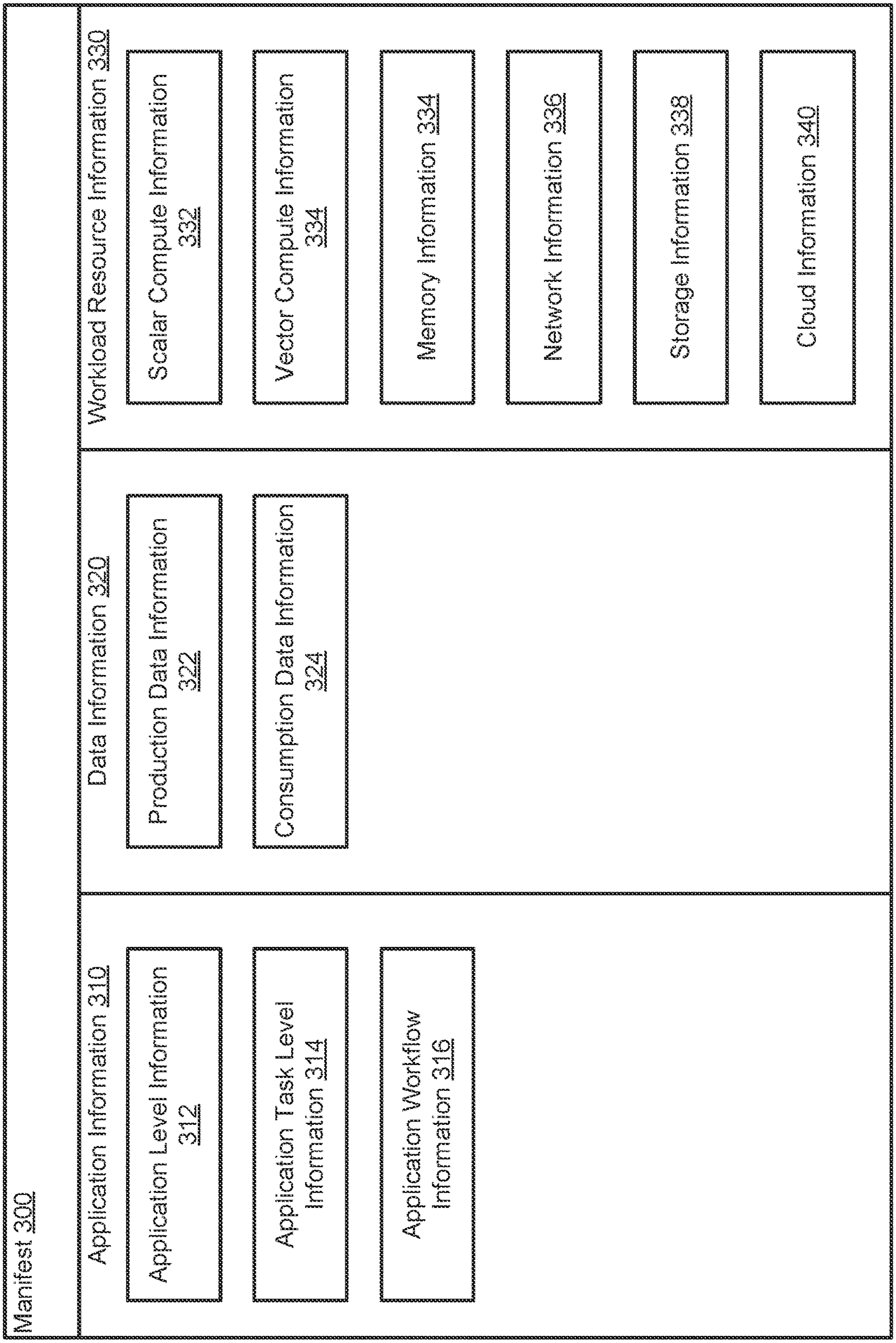
FIG. 3 shows a diagram of an example manifest in accordance with one or more embodiments disclosed herein.

FIG. 3 shows a diagram of a manifest in accordance with one or more embodiments disclosed herein. As discussed above, a user may submit a manifest (300) along with an application provisioning request using the application service layer (102, FIG. 1A) to the global controller (104, FIG. 1A) to provision an application in the MCIE environment (100, FIG. 1A). The manifest (300) may be configured and/or otherwise generated by the user by selecting, assigning, configuring, and/or including information associated with the application corresponding to the application provisioning request within the manifest (300).

The manifest (300) may be implemented as one or more data structures. The manifest (300) may be implemented as, for example, a YAML Ain't Markup Language (YAML) file. The manifest (300) may be used by the global controller (104, FIG. 1A) to perform global level scheduling services. The global controller (104, FIG. 1A) may include any portion of the information included in the manifest (300) in scheduling packages, which may be used by local controllers (e.g., 112A, 112B, 112N, FIG. 1A) to perform domain level scheduling services. The manifest (300) may include application information (310), data information (320), and workload resource information (330). The manifest (300) may include other and/or additional types of information that may be used to provision applications without departing from embodiments disclosed herein.

In one or more embodiments disclosed herein, the application information (310) includes application level information (312), application task level information (314), and application workflow information (316). The application information (310) may include other and/or additional information associated with the application to be provisioned without departing from embodiments disclosed herein.

The application level information (312) may include high level information associated with the application associated with the manifest. The high level information may include, for example, a request identifier associated with the application provisioning request corresponding to the manifest (300), a user identifier associated with the user that submitted the manifest (300), a cluster or application identifier associated with a previously provisioned application (e.g., for review, update, and delete requests), a request directive (e.g., a flag, tag, etc.) that specifies whether the application provisioning request is a create request, a review request, an update request, or a delete request, an runtime environment indicator and an application indicator (e.g., to indicate whether the manifest (300) is associated with an application and/or a runtime environment), and pre-emptible resource statuses.

The application level information (312) may also include target performance information associated with the application corresponding to the manifest (300). The performance information may include a target input latency associated with the manifest (300). The performance information may also include SLO metrics. The SLO metrics may include a target application response latency, a target application performance (e.g., percentage of successful completion of tasks), and a target application uptime. The application level information (312) may also include targeted domain information. The targeted domain information may specify the type of domains (e.g., edge, core, cloud) and/or specific domains that a user selected to use to provision the application. The application level information (312) may further include location information. The location information may include one or more geographical regions and/or locations selected by the user in which to provision the application. The application level information (312) may further include a chaos experiment sandbox indicator (e.g., a flag, a tag, etc.) that may indicate whether the chaos testing is to be performed for the application prior to final provisioning. The application level information (312) may include other and/or additional types of high level information associated with the application corresponding to the manifest (300) without departing from embodiments disclosed herein.

The application task level information (314) may include task specific information associated with the application corresponding to the manifest (300). The task specific information may include an application and/or runtime environment identifier, an application template identifiers, a runtime environment template identifiers, virtual machine template identifiers, task identifiers, task priorities, task execution times, task hardware requirements, task instruction set architecture (ISA) requirements, task accelerator requirements, task operating system requirements, virtual machine requirements, edge runtime environment requirements, cloud runtime environment requirements, and/or security cloud credentials. The application task level information may include other and/or additional task specific information without departing from embodiments disclosed herein.

The application workflow information (316) may include information that specifies the total workflow of the application corresponding to the manifest (300). The application workflow information (316) may include an order of execution for deployment of services of the application, a service dependency graph, an execution time target, a sync policy, a deployment duration, outside dependencies, and/or success criteria. The application workflow information (316) may include other and/or additional types of information associated with the workflow of the application corresponding to the manifest without departing from embodiments disclosed herein.

In one or more embodiments disclosed herein, the data information (320) includes production data information (322) and consumption data information (324. The data information (320) may include other and/or additional information associated with the data produced and/or consumed by the application to be provisioned without departing from embodiments disclosed herein.

In one or more embodiments disclosed herein, the production data information (322) may include information associated with the data produced by the application during execution. The production data information (322) may include, for example, storage identifiers, a list of directories, file system mount points, network addresses, URL addresses, and streaming services endpoints which all, or a portion thereof, may be used by the application to store data generated by the application. The production data information (322) may include other and/or additional information associated with the generation and storage of data generated by the application without departing from embodiments disclosed herein.

In one or more embodiments disclosed herein, the consumption data information (324) may include information associated with the data used by the application during execution. The consumption data information (324) may include, for example, data identifiers, file identifiers, file priorities, storage identifiers, a list of directories, file system mount points, network addresses, URL addresses, and streaming services endpoints which all, or a portion thereof, may be used by the application to access data consumed by the application. The consumption data information (324) may include other and/or additional information associated with the access and storage of data used by the application without departing from embodiments disclosed herein.

In one or more embodiments disclosed herein, the workload resource information (330) includes resource requirement information associated with all, or a portion thereof, the tasks of the application corresponding to the manifest (300). The resource requirement information may include scalar compute information (332), vector compute information (334), memory information (334), network information (336), storage information (338), and/or cloud information (340). The resource requirement information may include other and/or additional types of information associated with the resource requirements of the application tasks without departing from embodiments disclosed herein.

In one or more embodiments disclosed herein, the scalar compute information (332) includes scalar compute resource requirements associated with the application tasks. The scalar compute resource requirements may include task identifiers, critical path clock frequencies, minimum clock frequency, processor type, processor quantity, and/or domain identifiers. The scalar compute resource requirements may include other and/or additional information associated with the scalar compute resource requirements of the application tasks without departing from embodiments disclosed herein.

In one or more embodiments disclosed herein, the vector compute information (334) includes vector compute resource requirements associated with the application tasks. The vector compute resource requirements may include task identifiers, performance metrics (e.g., TeraFlops (TF), Tera Operations Per Second TOPS, etc.), minimum performance metrics (e.g., minimum TF, minimum TOPS, etc.), domain specific accelerator types, processor types, domain identifiers, processor quantities, quantity of GPU memory, quantity of FPGA logic cells, and/or peer-to-peer information (e.g., NVLink, PCIE, inter-GPU network type, etc.). The vector compute resource requirements may include other and/or additional information associated with the vector compute resource requirements of the application tasks without departing from embodiments disclosed herein.

In one or more embodiments disclosed herein, the memory information (334) may specify memory requirements associated with the application tasks. The memory requirements may include task identifiers, memory types, domain identifiers, quantity of memory, and/or minimum quantity of memory. The memory requirements may include other and/or additional information regarding memory requirements of the application tasks without departing from embodiments disclosed herein.

In one or more embodiments disclosed herein, the network information (336) may include network requirements associated with application tasks. The network requirements may include, task identifiers, network type (e.g., Ethernet, RDMA, etc.), types of network devices, average required network bandwidth, peak required network bandwidth, minimum required network bandwidth, and/or quantity of network devices. The network requirements may include other and/or additional information regarding network requirements of the application tasks without departing from embodiments disclosed herein.

In one or more embodiments disclosed herein, the storage information (338) includes data storage requirements associated with the application tasks. The data storage requirements may include, task identifiers, storage device types (e.g., HDDs, NVME, PMEM, etc.), domain identifiers, quantity of storage per domain required, and/or storage size by storage device type and location (e.g., domain type and/or geographical location). The storage requirements may include other and/or additional information regarding storage requirements of the application tasks without departing from embodiments disclosed herein.

In one or more embodiments disclosed herein, the cloud information (340) includes cloud requirements associated with the application tasks. The cloud requirements may include task identifiers, cloud types, cross plane supported configuration options, and/or cloud configuration requirements. The cloud requirements may include other and/or additional information regarding cloud requirements of the application tasks without departing from embodiments disclosed herein.

As discussed herein, an identifier may refer to a unique combination of characters that may be used to specify and/or identify a particular entity. The characters may include numerical characters referencing numbers assigned to particular entities. The characters may refer to alphabetical characters referencing a name assigned to particular entities. The characters may further refer to alphanumeric characters that includes a combination of numeric characters and alphabetic characters. An identifier may refer to a local (e.g., may be used by a particular executing entity such as the global controller) and/or a global identifier (e.g., may be used by all executing entities within the system) without departing from embodiments disclosed herein.

FIGS. 4A-4D show flowcharts of a method for provisioning an application in accordance with one or more embodiments disclosed herein. The method of FIGS. 4A-4D may be performed by, for example, the global controller (104, FIG. 1A). Other components illustrated in FIG. 1A may perform all, or a portion, of the steps shown in FIGS. 4A-4D without departing from embodiments disclosed herein. While the various steps in the flowchart shown in FIGS. 4A-4D are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

Figure 4A:
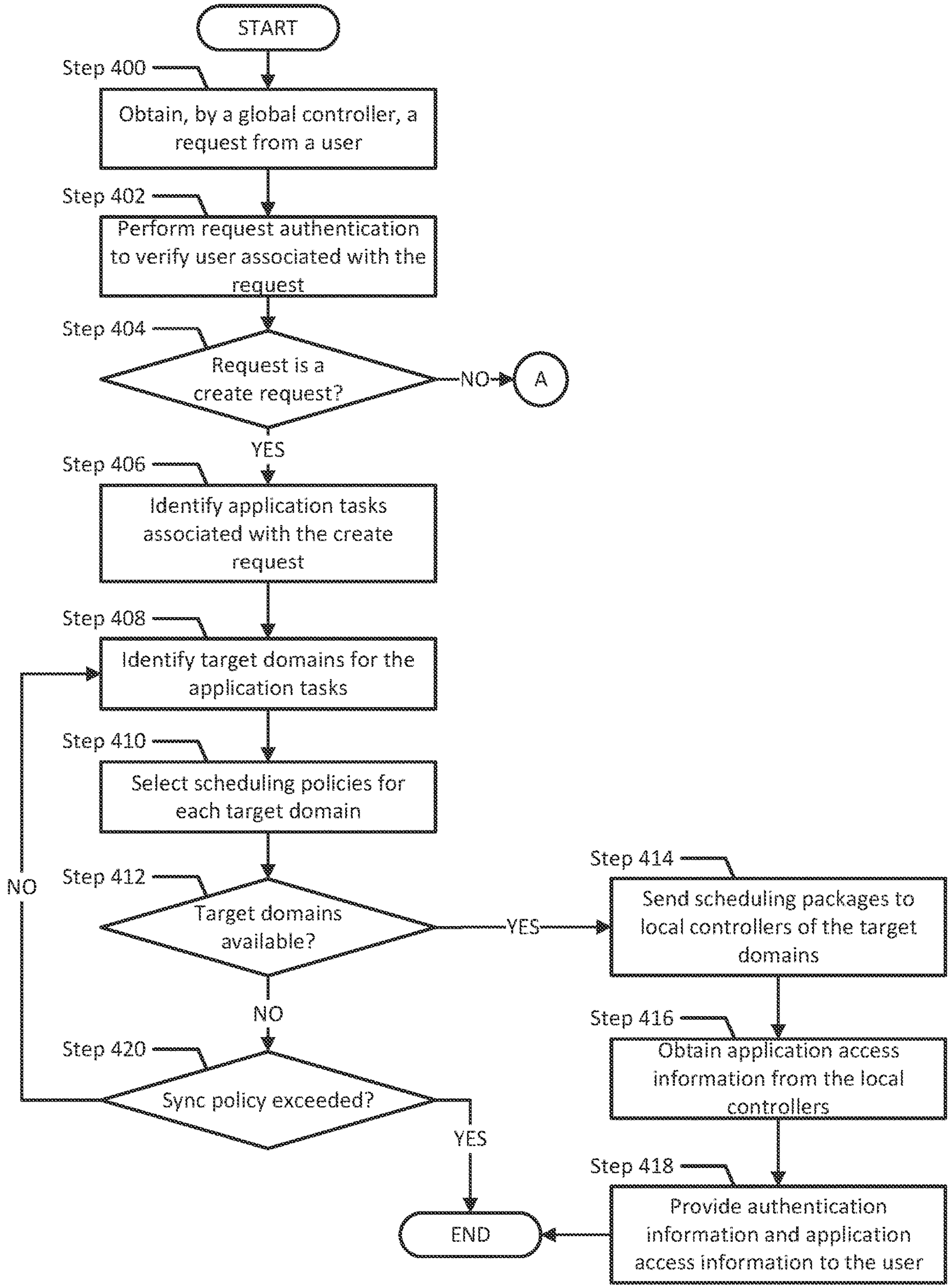
FIGS. 4A-4D show flowcharts of a method for provisioning an application in accordance with one or more embodiments disclosed herein.

Turning to FIG. 4A, at Step 400, a request is obtained from a user. The request may be an application provisioning request. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may include a manifest without departing from embodiments disclosed herein. The request may further include authentication information associated with the user. The request may be obtained from the user via other and/or additional methods without departing from embodiments disclosed herein.

At Step 402, request authentication is performed to verify the user associated with the request. As discussed above, the request may include authentication information associated with the user. The authentication information may include, for example, a user identifier, a company identifier, security credentials (e.g., a username, a password, a personal identification number (PIN), etc.), and/or security information (e.g., encryption keys, digital signatures, etc.). In one or more embodiments disclosed herein, the global control uses the authentication information included in the request to perform authentication to verify the user associated with the request. The global controller may use any appropriate method for performing authentication using the authentication information without departing from embodiments disclosed herein. For example, the global controller may compare a user identifier, company identifier, and/or security credentials with a list of existing user identifiers, company identifiers, and/or security credentials maintained by the global controller and verify the user by identifying a match between the user identifier, company identifiers, and/or security credentials. The global controller may perform request authentication to verify the user associated with the request via other and/or additional methods without departing from embodiments disclosed herein.

Although not illustrated in the flowchart of FIG. 4A, if the global controller is unable to verify the user associated with the request, then the method may end following Step 402. In another embodiment disclosed herein, if the global controller is unable to verify the user associated with the request, then the global controller may send an error notification that specifies that the request authentication failed to the user. After sending the error notification, the method may end following Step 402.

At Step 404, a determination is made as to whether the request is a create request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is a create request. In one or more embodiments disclosed herein, if the request directive includes a tag or set flag associated with a create request, then the global controller may determine that the request is a create request. In one or more embodiments disclosed herein, if the request directive does not include a tag or set flag associated with a create request (e.g., includes a tag or set flag associated with another type of request), then the global controller may determine that the request is not a create request. The global controller may determine whether the request is a create request via other and/or additional methods without departing from embodiments disclosed herein.

In one or more embodiments disclosed herein, if it is determined that the request is a create request, then the method proceeds to Step 406. In one or more embodiments disclosed herein, if it is determined that the request is not a create request, then the method proceeds to Step 422 of FIG. 4B.

At Step 406, application tasks associated with the create request are identified. As discussed above, the request may include a manifest. The manifest may specify the application tasks associated with the application corresponding with the create request (e.g., within the application task level information (314, FIG. 3) of the manifest (300, FIG. 3)). The global controller may parse the manifest to identify the application tasks associated with the application corresponding the create request. The application tasks associated with the create request may be identified via other and/or additional methods without departing from embodiments disclosed herein.

At Step 408, target domains for the application tasks are identified. In one or more embodiments disclosed herein, the global controller identifies target domains for the application tasks based on the manifest included in the request and capability information associated with the domains included in the MCIE environment. As discussed above, the manifest may include information that the global controller may use to schedule the application to one or more target domains included in the MCIE environment information. For each application task, the global controller may identify a target domain that satisfies the scheduling requirements included in the manifest. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all or a portion of the graph database) to specify the capabilities of the MCIE domains. Any quantity of target domains may be identified for any quantity of application tasks without departing from embodiments disclosed herein. Target domains for the application tasks may be identified via other and/or additional methods without departing from embodiments disclosed herein.

At Step 410, scheduling policies are selected for each target domain. In one or more embodiments disclosed herein, the global controller selects scheduling policies based on the manifest. In addition to the discussion of FIG. 3, the manifest included in the request may specify whether a user has requested to select a particular scheduling policy and, if selected, a priority associated with the selected scheduling policy. As discussed above, the scheduling policies may include makespan minimization, scheduling efficiency, resource utilization, and resource cost. In addition to the manifest, the global controller may select scheduling policies and/or associated priorities based on load information associated with the local controllers. The global controller may have access to current and/or future predicted load information associated with the local controllers of the target domains. For local controllers associated with high loads (e.g., performing a scheduling a large quantity of application tasks or include a larger quantity of application task scheduling jobs than a configurable backlog limit), then the global controller may deprioritize or refrain from selecting computationally intensive scheduling policies such as makespan minimization. The global controller may select scheduling policies for each target domain via other and/or additional methods without departing from embodiments disclosed herein.

At Step 412, a determination is made as to whether the target domains are available. In one or more embodiments disclosed herein, the global controller uses capacity information associated with each target domain to determine whether the target domain includes the available capacity to execute the associated application task(s). As discussed above, the global controller may obtain capacity information (e.g., as included in the graph database) from the local controller associated with each information. The global controller may compare the scheduling requirements associated each application task with the corresponding target domain's available capacity. In one or more embodiments disclosed herein, if the available capacity of the target domains exceeds the storage requirements of all associated application tasks, then the global controller may determine that the target domains are available. In one or more embodiments disclosed herein, if the available capacity of the target domains does not exceed the storage requirements of all associated application tasks, then the global controller may determine that not all the target domains are available. The global controller may determine whether the target domains are available via other and/or additional methods without departing from embodiments disclosed herein.

In one or more embodiments disclosed herein, if it is determined that the target domains are available, the method proceeds to Step 414. In one or more embodiments disclosed herein, if it is determined that at least one target domain are not available, the method proceeds to Step 420.

At Step 414, scheduling packages are sent to the local controllers of the target domains. In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

At Step 416, application access information is obtained from the local controllers. After obtaining the scheduling packages, the local controllers may use the scheduling packages to perform domain level scheduling services. As a result, the local controllers may send scheduling assignments and provisioning commands to endpoint controllers, which may implement the scheduling assignments and provisioning commands to instantiate the application tasks within the target domains. Additionally, the local controllers may obtain and/or generate application access information associated with the application from the local controllers. The local controllers may then provide the application access information to the global controller. In one or more embodiments disclosed herein, the application access information is sent to the global controller using any appropriate method of data transmission. As an example, the local controllers may communicate the application access information as network data traffic units over a series of network devices that operatively connect the local controllers of the target domains and the global controller. Application access information may be obtained from the local controllers via other and/or additional methods without departing from embodiments disclosed herein.

In one or more embodiments disclosed herein, the application access information refers to one or more data structures that may be used by the user that submitted the request to access the application provisioned within the MCIE environment. The application access information may include access information associated with the application. The application access information may include domain identifiers, device identifiers, URLs, network addresses, etc. associated with the provisioned application. The application access information may include other and/or additional information associated with provisioned application without departing from embodiments disclosed herein.

At Step 418, authentication information and application access information is provided to the user. In one or more embodiments disclosed herein, the authentication information and the application access information are provided to the user through the application service layer using any appropriate method of data transmission. As an example, the global controller may communicate the authentication information and the application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The authentication information and the application access information may be provided to the user via other and/or additional methods without departing from embodiments disclosed herein.

In one or more embodiments disclosed herein, the method ends following step 418.

At Step 420, a determination is made as to whether the sync policy is exceeded. In one or more embodiments disclosed herein, a sync policy may refer to one or more data structures that include retry requirements associated with application. The retry requirements may specify a retry count limit and/or a retry time limit. The retry count limit may begin upon receipt of the request. The sync policy may be included in the manifest. In one or more embodiments disclosed herein, the global controller checks retry count and/or the retry time exceed the retry count limit and/or the retry time limit respectively. In one or more embodiments disclosed herein, if the retry count and/or the retry time do not exceed the retry count limit and/or the retry time limit respectively, then the global controller may determine that the sync policy is not exceeded. In one or more embodiments disclosed herein, if the retry count or the retry time exceed the retry count limit or the retry time limit respectively, then the global controller may determine that the sync policy is exceeded. The determination as to whether the sync policy is exceeded may be made via other and/or additional methods without departing from embodiments disclosed herein.

In one or more embodiments disclosed herein, if it is determined that the sync policy is exceeded, then the method ends following Step 420. In one or more embodiments disclosed herein, if it is determined that the sync policy is not exceeded, then the method proceeds to Step 408 to identify new target domains associated with application tasks which were associated with unavailable target domains as determined in Step 412.

Figure 4B:
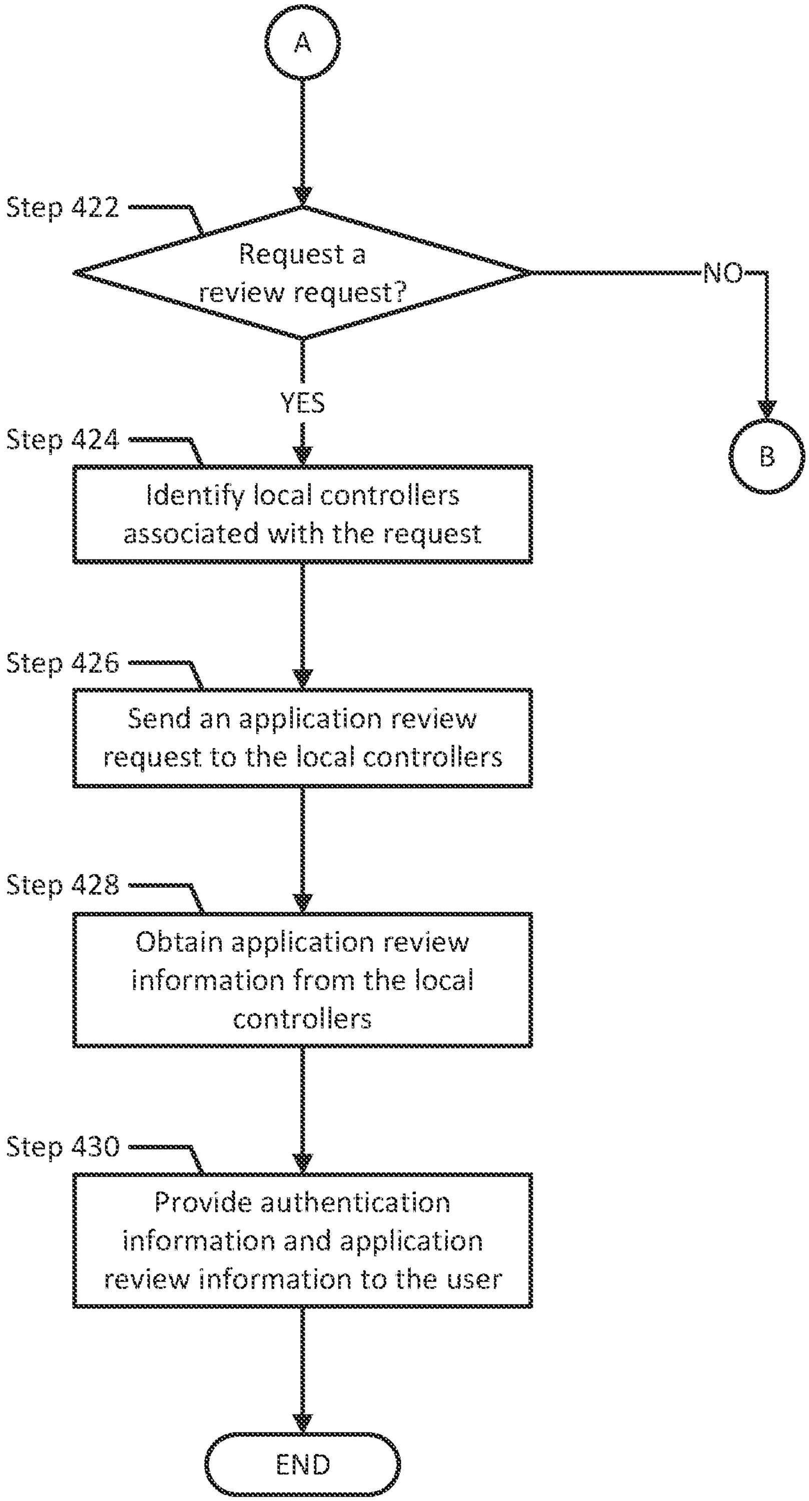

Turning to FIG. 4B, at Step 422, a determination is made as to whether the request is a create request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is a review request. In one or more embodiments disclosed herein, if the request directive includes a tag or set flag associated with a review request, then the global controller may determine that the request is a review request. In one or more embodiments disclosed herein, if the request directive does not include a tag or set flag associated with a review request (e.g., includes a tag or set flag associated with another type of request), then the global controller may determine that the request is not a review request. The global controller may determine whether the request is a review request via other and/or additional methods without departing from embodiments disclosed herein.

In one or more embodiments disclosed herein, if it is determined that the request is a review request, then the method proceeds to Step 424. In one or more embodiments disclosed herein, if it is determined that the request is not a review request, then the method proceeds to Step 432 of FIG. 4C.

At Step 424, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The review request may include a correlation identifier associated with the application with which the review request is associated. The global controller may use the correlation identifier included in the review request to identify the local controller identifiers included in the provisioned application access information that are associated with the correlation identifier. Local controllers associated with the request may be identified via other and/or additional methods without departing from embodiments disclosed herein.

At Step 426, an application review request is sent to the local controllers. In one or more embodiments disclosed herein, an application review request is sent to each of the local controllers using any appropriate method of data transmission. As an example, the global controller may communicate the application review requests as network data traffic units over a series of network devices that operatively connect the local controllers to the global controller. The application review request may be sent to the local controllers via other and/or additional methods without departing from embodiments disclosed herein.

At Step 428, application review information is obtained from the local controllers. In response to obtaining the application review requests, the local controller may obtain and/or generate review information associated with the application. The application review information may refer to one or more data structures that include any information associated with the status of the application without departing from embodiments disclosed herein. The review information may include, for example, performance metrics (e.g., SLOs, service success rate, service latencies, etc.), service uptimes, etc. After generating and/or obtaining the application review information, the local controller may provide the application review information to the global controller. In one or more embodiments disclosed herein, application review information is sent to the global controller using any appropriate method of data transmission. As an example, the local controllers may communicate the application review information as network data traffic units over a series of network devices that operatively connect the local controllers to the global controller. The application review information may be obtained from the local controllers via other and/or additional methods without departing from embodiments disclosed herein.

At Step 430, authentication information and the application review information are sent to the user. The global controller may compile the application review information obtained from the local controllers. In one or more embodiments disclosed herein, the application review information and the authentication information are sent to the user through the application service layer using any appropriate method of data transmission. For additional information regarding authentication information, refer to Step 418 of FIG. 4A. As an example, the global controller may communicate the application review information and the authentication information as network data traffic units over a series of network devices that operatively connect the global controller to the application service layer. The application review information and the authentication information may be sent to the user via other and/or additional methods without departing from embodiments disclosed herein.

In one or more embodiments disclosed herein, the method ends following Step 430.

Figure 4C:
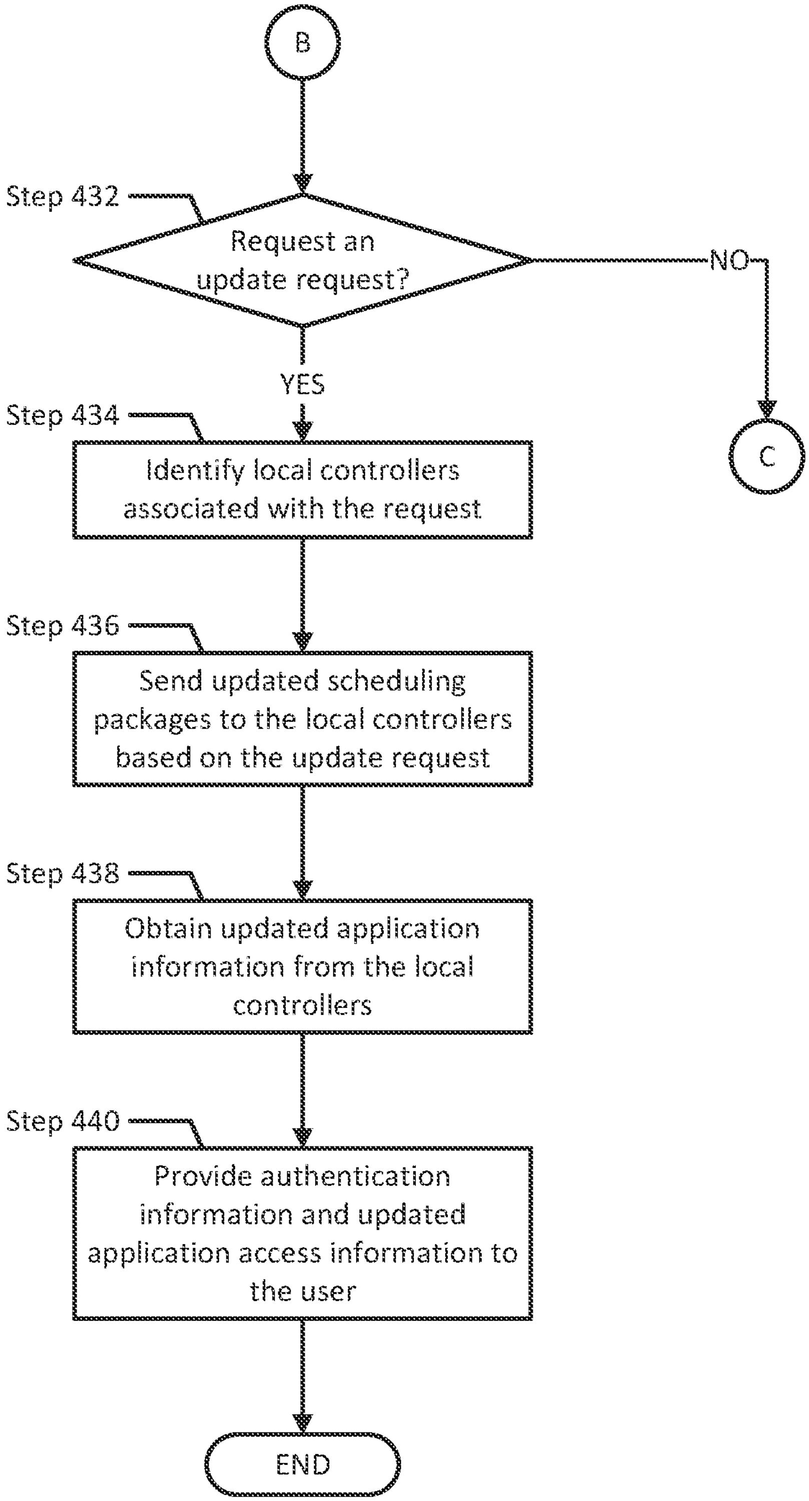

Turning to FIG. 4C, at Step 432, a determination is made as to whether the request is an update request. As discussed above, the request may include a manifest. Moreover, the manifest may include a request directive. The request directive may specify whether the request is a create request, review request, update request, or delete request. The request directive may be implemented as tags and/or flags, each associated with a create request, a review request, an update request, and a delete request. The request directive included in the manifest may include either a single tag associated with the type of request corresponding to the request or a single set flag associated with the type of request corresponding to the request.

In one or more embodiments disclosed herein, the global controller checks the request directive to determine whether the request is an update request. In one or more embodiments disclosed herein, if the request directive includes a tag or set flag associated with an update request, then the global controller may determine that the request is an update request. In one or more embodiments disclosed herein, if the request directive does not include a tag or set flag associated with an update request (e.g., includes a tag or set flag associated with another type of request), then the global controller may determine that the request is not an update request. The global controller may determine whether the request is an update request via other and/or additional methods without departing from embodiments disclosed herein.

In one or more embodiments disclosed herein, if it is determined that the request is an update request, then the method proceeds to Step 406. In one or more embodiments disclosed herein, if it is determined that the request is not an update request, then the method proceeds to Step 442 of FIG. 4D.

At Step 434, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The request may include a correlation identifier associated with the application with which the review request is associated. The global controller may use the correlation identifier included in the request to identify the local controller identifiers included in the provisioned application access information that are associated with the correlation identifier.

The manifest may specify one or more application tasks and/or domains that may be updated. The global controller may also identify local controllers associated with the request based on the manifest. Additionally, if the manifest associated with the update request indicates that additional and/or different domains are required to perform the application update request, then the global controller may identify local controller associated with target domains based on the manifest as discussed in Steps 406 and 408 of FIG. 4A. Local controllers associated with the request may be identified via other and/or additional methods without departing from embodiments disclosed herein. Local controllers associated with the request may be identified via other and/or additional methods without departing from embodiments disclosed herein.

At Step 436, an updated scheduling package(s) are sent to the local controllers based on the update request. Updated scheduling package(s) may be sent to the local controllers based on the update request as discussed above in Step 414 of FIG. 4A.

At Step 438, updated application access information is obtained from the local controllers. After obtaining the updated scheduling packages, the local controllers may use the updated scheduling packages to perform domain level scheduling services to update the provisioned application. As a result, the local controllers may send scheduling assignments and provisioning commands to endpoint controllers, which may implement the scheduling assignments and provisioning commands to instantiate the application tasks within the target domains. Additionally, the local controllers may obtain and/or generate updated application access information associated with the application from the local controllers. The local controllers may then provide the updated application access information to the global controller. In one or more embodiments disclosed herein, the updated application access information is sent to the global controller using any appropriate method of data transmission. As an example, the local controllers may communicate the updated application access information as network data traffic units over a series of network devices that operatively connect the local controllers of the target domains and the global controller. Updated application access information may be obtained from the local controllers via other and/or additional methods without departing from embodiments disclosed herein.

In one or more embodiments disclosed herein, the updated application access information is an embodiment of the application access information discussed above in Step 416.

At Step 440, authentication information and the updated application access information are sent to the user. In one or more embodiments disclosed herein, the authentication information and the updated application access information are provided to the user through the application service layer using any appropriate method of data transmission. As an example, the global controller may communicate the authentication information and the updated application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The authentication information and the updated application access information may be provided to the user via other and/or additional methods without departing from embodiments disclosed herein.

In one or more embodiments disclosed herein, the method ends following Step 440.

Figure 4D:
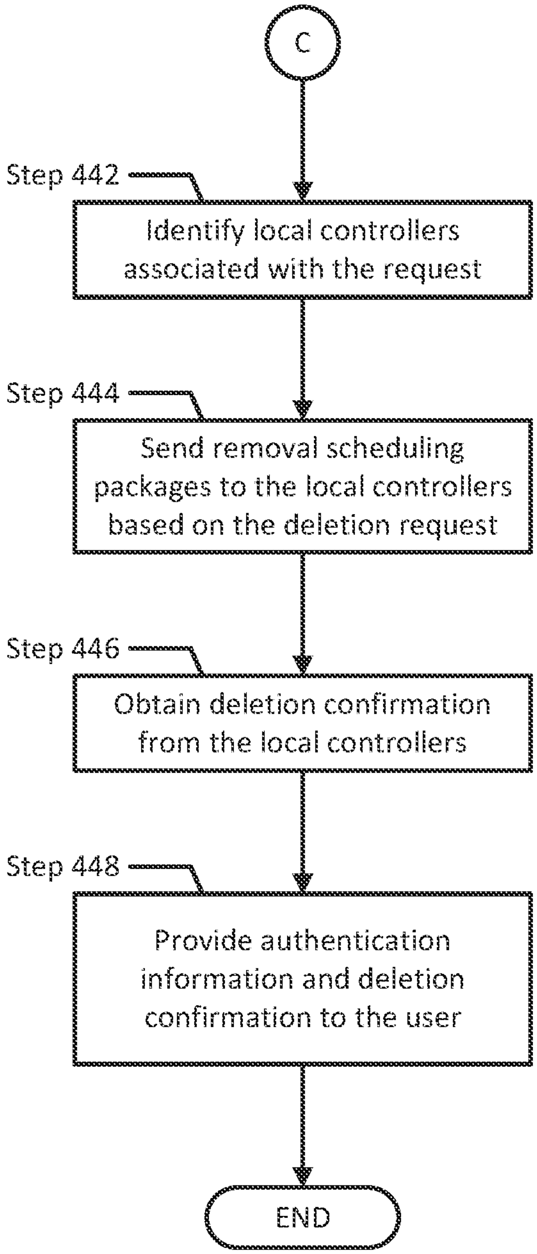

Turning to FIG. 4D, at Step 442, local controllers associated with the request are identified. The global controller may include or otherwise have access to provisioned application access information. The provisioned application access information may include correlation identifiers, user identifiers, domain identifiers, and/or local controller identifiers associated with previously provisioned applications. The global controller update the provisioned application access information when new applications are provisioned, applications are updated, and/or when applications are deleted. The request may include a correlation identifier associated with the application with which the review request is associated. The global controller may use the correlation identifier included in the request to identify the local controller identifiers included in the provisioned application access information that are associated with the correlation identifier. Local controllers associated with the request may be identified via other and/or additional methods without departing from embodiments disclosed herein.

At Step 444, removal scheduling packages are sent to the local controllers based on the deletion request. In one or more embodiments disclosed herein, the global controller generates a removal scheduling package for each target domain.

In one or more embodiments disclosed herein, a removal scheduling package may refer to one or more data structures that may be used delete all, or a portion thereof (e.g., application tasks), of an application from the MCIE environment. The removal scheduling package may specify the application task(s) to be removed. A removal scheduling package may include other and/or additional information that may be used to remove application tasks from MCIE domains without departing from embodiments disclosed herein.

In one or more embodiments disclosed herein, the global controller sends to generated removal scheduling packages to the local controllers of the associated domains. In one or more embodiments disclosed herein, the removal scheduling packages are sent to the local controllers using any appropriate method of data transmission. As an example, the global controller may communicate the removal scheduling packages as network data traffic units over a series of network devices that operatively connect the local controllers of the target domains and the global controller. The removal scheduling packages may be sent to the local controllers of the target domains via other and/or additional methods without departing from embodiments disclosed herein.

At Step 446, deletion confirmation is obtained from the local controllers. In one or more embodiments disclosed herein, the deletion confirmation may refer to a message that indicates that application tasks and/or the application were successfully deleted. The deletion confirmation may be sent to the global controller using any appropriate method of data transmission. As an example, the local controllers may communicate the deletion confirmation as network data traffic units over a series of network devices that operatively connect the local controllers and the global controller. The deletion confirmation may be obtained from the local controllers via other and/or additional methods without departing from embodiments disclosed herein.

At Step 448, authentication information and the deletion confirmation are sent to the user. In one or more embodiments disclosed herein, the authentication information and the deletion confirmation are provided to the user through the application service layer using any appropriate method of data transmission. As an example, the global controller may communicate the authentication information and the deletion confirmation as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier). The authentication information and the deletion confirmation may be provided to the user via other and/or additional methods without departing from embodiments disclosed herein.

In one or more embodiments disclosed herein, the method ends following Step 448.

First Example

The following section describes a first example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller provides global level scheduling services for an MCIE environment. At a first point in time, a user submits an application provisioning request to the global controller through the application service layer. The request includes user identifier and a personal identification number (PIN) associated with the user. In response to obtaining the request, the global controller performs request authentication to verify the user associated with the request. The global controller includes a list of registered user identifiers and PINs associated with each user identifier. The global controller performs authentication to verify the user by determining the user identifier and the PIN included in the request match a user identifier and corresponding PIN included in the list of registered users stored in the global controller.

After performing request authentication, the global controller determines whether the request is a create request. The request further includes a manifest. The manifest includes a request directive. The global controller identifies the request directive indicates that the application provisioning request is a create request for scheduling a new application within the MCIE environment. Next, the global controller identifies that the manifest specifies that the application includes twenty application tasks. The global controller then identifies that the manifest specifies that the user desires to provision the application in the geographical region of the state of Texas. The global controller then identifies, using capability information associated with the domains included in the MCIE environment, that the MCIE environment includes one cloud domain, two core domains, and ten edge domains in the state of Texas.

After identifying the domains included in the state of Texas, the global controller uses the scheduling requirements (e.g., hardware requirements) associated with each application tasks and capability information associated with the application tasks to identify target domains that satisfy the scheduling requirements. The target domains include the cloud domain, one of the two core domains, and one of the edge domains. Ten application tasks are to be scheduled into the cloud domain, seven application tasks are to be scheduled in the core domain, and the remaining three application tasks are to be scheduled in the edge domain. After identifying the target domains associated with each application task, the global controller then selects scheduling policies for each target domain. The global controller determines that the manifest specifies that the user has selected the default priority and selection of scheduling policies. As a result, each target domain will include the following scheduling policies in order from highest to lowest priority, makespan minimization, scheduling efficiency, resource utilization, and resource cost.

After selecting the scheduling policies for each target domain, the global controller determines whether each target domain is available by comparing the scheduling requirements of the application tasks associated with the target domains to capacity information associated with the target domains. For each of the three target domains, the capacity information exceeds the scheduling requirements. Accordingly, the global controller determines that each of the three target domains are available.

In response to the determination, the global controller generates a scheduling package for each of the target domains. The scheduling packages include the application tasks scheduled to the corresponding domains. The scheduling packages also include the selected scheduling policies and manifest information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

As a result, the local controllers obtain application access information including URLs and network addresses that the user may use to access the portions of the application provisioned to the three domains. The local controller provides the application access information to the global controller, which then provides the application access information to the user through the application service layer. The global controller also generates a correlation identifier associated with the provisioned application. The correlation identifier may also be provided by the user, who may use the correlation identifier to access the application and submit future application provisioning request associated with the application.

End of First Example

Figure 5:
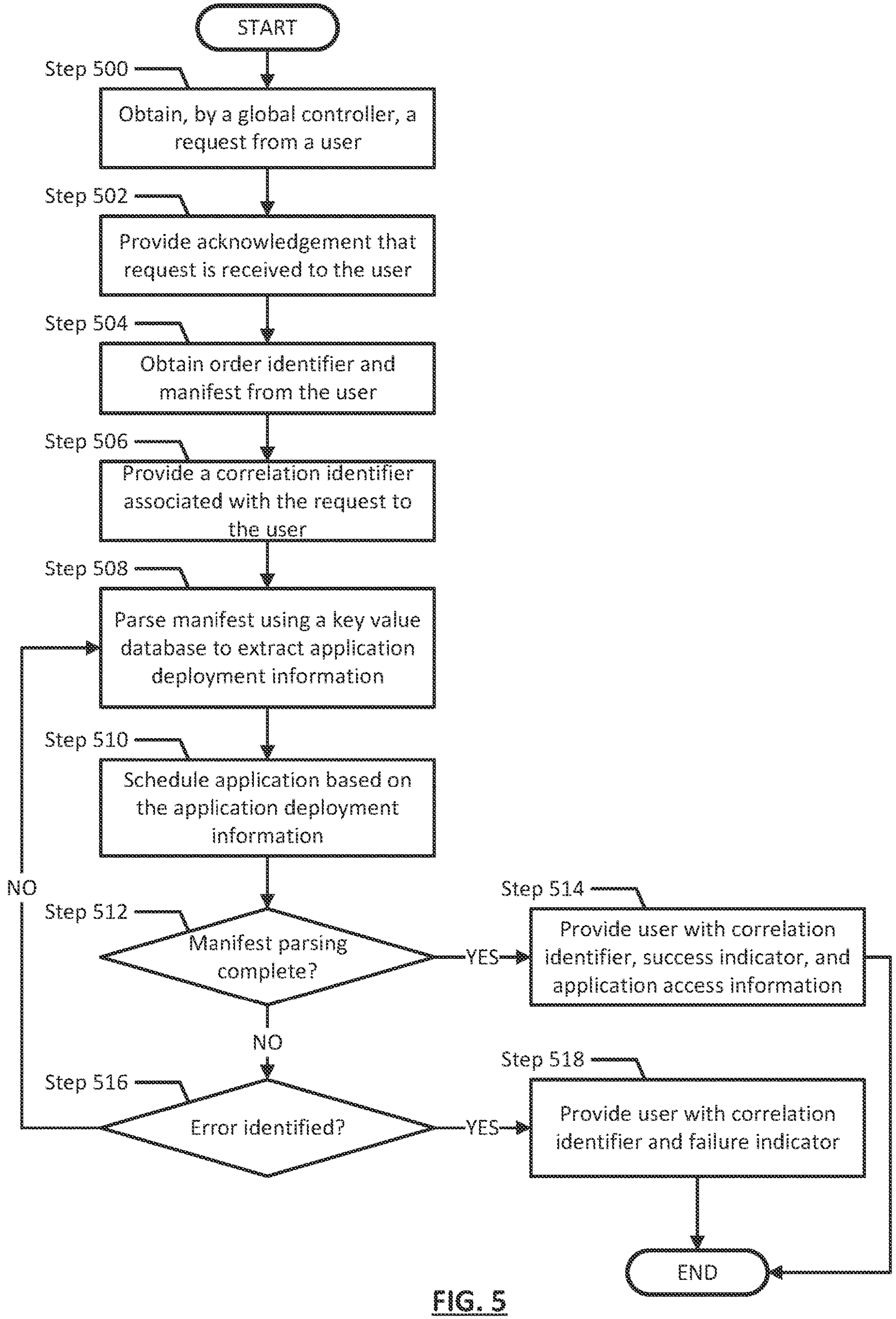
FIG. 5 shows a flowchart of a method for parsing a manifest to provision an application in accordance with one or more embodiments disclosed herein.

FIG. 5 shows a flowchart of a method for parsing a manifest to provision an application in accordance with one or more embodiments disclosed herein. The method of FIG. 5 may be performed by, for example, the global controller (104, FIG. 1A). Other components illustrated in FIG. 1A may perform all, or a portion, of the steps shown in FIG. 5 without departing from embodiments disclosed herein. While the various steps in the flowchart shown in FIG. 5 are presented and described sequentially, one of ordinary skill in the relevant art, having the benefit of this Detailed Description, will appreciate that some or all of the steps may be executed in different orders, that some or all of the steps may be combined or omitted, and/or that some or all of the steps may be executed in parallel.

At Step 500, a request from a user is obtained. In one or more embodiments disclosed herein, the request is obtained from the user through the application service layer using any appropriate method of data transmission. As an example, the application service layer may communicate the request as network data traffic units over a series of network devices that operatively connect the application service layer and the global controller. The request may be obtained from the user via other and/or additional methods without departing from embodiments disclosed herein.

At Step 502, acknowledgement that the request is received is provided to the user. In response to obtaining the request, in one or more embodiments disclosed herein, the global controller provides acknowledgement that the request is received to the user through the application service layer using any appropriate method of data transmission. As an example, the global controller may communicate the request as network data traffic units over a series of network devices that operatively connect the application service layer and the global controller. The acknowledgement that the request is received may be provided to the user via other and/or additional methods without departing from embodiments disclosed herein.

At Step 504, an order identifier and a manifest is obtained from the user. In response to obtaining the acknowledgment, the user may send the order identifier and the manifest associated with the request to the global controller through the application service layer. In one or more embodiments disclosed herein, the user provides the order identifier and the manifest to the global controller through the application service layer using any appropriate method of data transmission. As an example, the user may communicate the order identifier and the manifest as network data traffic units over a series of network devices that operatively connect the application service layer and the global controller. The acknowledgement that the request is received may be provided to the user via other and/or additional methods without departing from embodiments disclosed herein.

At Step 506, a correlation identifier associated with the request is sent to the user. In one or more embodiments disclosed herein, the global controller generates and/or obtains a correlation identifier. The correlation identifier may be associated with the order identifier and the application provisioning job associated with the order identifier. The correlation identifier may be used to associate the user and the order identifier with the application corresponding to the request. The user may use the correlation identifier to submit future requests associated with the application. In one or more embodiments disclosed herein, the global controller provides correlation identifier to the user through the application service layer using any appropriate method of data transmission. As an example, the global controller may communicate the request as network data traffic units over a series of network devices that operatively connect the application service layer and the global controller. The correlation identifier associated with the request may be provided to the user via other and/or additional methods without departing from embodiments disclosed herein.

In one or more embodiments disclosed herein, the performance of Step 500 through Step 506 implement a light stateful approach between the global controller and the application service layer (e.g., user). A light stateful approach may refer to minimal maintenance of state between the global controller and the application service layer when services application provisioning requests. As a result, application provisioning requests may be serviced by the global controller with minimal status updates, requests, confirmations, and/or information being shared between the global controller and the application service layer. Therefore, a light stateful approach may improve the efficiency of servicing application provisioning requests, and enable the global controller to service a large quantity of application service requests.

At Step 508, the manifest is parsed using a key value database to extract application deployment information. In one or more embodiments disclosed herein, the global controller may parse the manifest upon receipt of the manifest in Step 504 without waiting for the entirety of the manifest to be obtained. The global controller parse the manifest by extracting application deployment information included in the manifest using a key value database. A key value database may refer to a data storage method that stores objects (e.g., application deployment information, application programming interface (API) calls used to extract application deployment information and/or perform global scheduling services, etc.) and associated keys. The keys may refer to hashes, numbers, and/or identifiers which may be associated with particular objects stored in the key value database. The keys may be used to quickly retrieve objects stored in the key value database. The application deployment information may include all, or a portion thereof, the information included in the manifest that may be used to provision the application associated with the manifest within the MCIE environment. For additional information regarding the information included in the manifest, refer to FIG. 3. The manifest may be parsed using a key value database to extract application deployment information via other and/or additional methods without departing from embodiments disclosed herein.

At Step 510, an application is scheduled based on the application deployment information. In one or more embodiments disclosed herein, the global controller schedules the application based on application deployment information by identifying target domains for the application tasks based on the application deployment information and capability information associated with the domains included in the MCIE environment. The application deployment information may include information that the global controller may use to schedule the application to one or more target domains included in the MCIE environment information. For each application task, the global controller may identify a target domain that satisfies the scheduling requirements included in the application deployment information. The scheduling requirements may include user specified domain types, hardware requirements (e.g., compute requirements, memory requirements, domain accelerator requirements, network requirements, and/or storage requirements), geographical location requirements, etc. The global controller may use capability information associated with the MCIE domains provided by the local controllers (e.g., all or a portion of the graph database) to specify the capabilities of the MCIE domains. Any quantity of target domains may be identified for any quantity of application tasks without departing from embodiments disclosed herein. Target domains for the application tasks may be identified via other and/or additional methods without departing from embodiments disclosed herein.

In one or more embodiments disclosed herein, the global controller generates a scheduling package for each target domain.

In one or more embodiments disclosed herein, a scheduling package may refer to one or more data structures that may be used by the local controller of an associated target domain to perform domain level scheduling services. The scheduling package may specify the application task(s) to be scheduled, all, or a portion thereof, the information included in the manifest associated with the application task(s), and the selected scheduling policies and the associated priorities of the selected scheduling policies. A scheduling package may include other and/or additional information that may be used to perform domain level scheduling services without departing from embodiments disclosed herein.

In one or more embodiments disclosed herein, the global controller sends to generated scheduling packages to the local controllers of the associated target domains. In one or more embodiments disclosed herein, the scheduling packages are sent to the local controllers using any appropriate method of data transmission. As an example, the global controller may communicate the scheduling packages as network data traffic units over a series of network devices that operatively connect the local controllers of the target domains and the global controller. The scheduling packages may be sent to the local controllers of the target domains via other and/or additional methods without departing from embodiments disclosed herein.

The application may be scheduled based on the application deployment information via other and/or additional methods without departing from embodiments disclosed herein.

At Step 512, a determination is made as to whether the manifest parsing is complete. As discussed above, the global controller may parse the manifest upon receipt of the manifest in Step 504 without waiting for the entirety of the manifest to be obtained. As a result, the global controller may perform Steps 504, 508, and 510 as the manifest is ingested by the global controller until the manifest is completely parsed and the scheduling is complete. The global controller may determine whether the manifest parsing using any appropriate method for identifying an end of a data structure without departing from embodiments disclosed herein. For example, the global controller may use an end-of-file flag associated with the manifest to determine whether the parsing of the manifest is complete. The end-of-file flag may indicate that no additional data may be included in the manifest. In one or more embodiments disclosed herein, if the global controller has not identified the end-of-file flag included in the manifest during parsing, then the global controller determines that the manifest parsing is not complete. In one or more embodiments disclosed herein, if the global controller has identifies the end-of-file flag included in the manifest during parsing, then the global controller determines that the manifest parsing is complete. The determination as to whether the manifest parsing is complete may be made via other and/or additional methods without departing from embodiments disclosed herein.

In one or more embodiments disclosed herein, if it is determined the manifest parsing is complete, then the method proceeds to Step 514. The global controller may wait until the entirety of the application (e.g., all application tasks) is scheduled to one or more target domains prior to proceeding to Step 514. In one or more embodiments disclosed herein, if it is determined the manifest parsing is not complete, then the method proceeds to Step 518.

At Step 514, the correlation identifier, success indicator, and application access information are provided to the user. In one or more embodiments disclosed herein, the correlation identifier, the success indicator, and the application access information are provided to the user through the application service layer using any appropriate method of data transmission. As an example, the global controller may communicate the correlation identifier, the success indicator, and the application access information as network data traffic units over a series of network devices that operatively connect the application service layer and the global controller. The authentication information may be one or more data structures that include a correlation identifier which may be associated with the provisioned application which the user may use to access and submit further request associated with the provisioned application. The authentication information may include other and/or additional information (e.g., a user identifier, successful provisioning confirmation, etc.). The success indicator may be a flag, tag, message, etc. that indicates to the user that the application provisioning request was successfully serviced. The correlation identifier, the success indicator, and the application access information may be provided to the user via other and/or additional methods without departing from embodiments disclosed herein.

In one or more embodiments disclosed herein, the application access information refers to one or more data structures that may be used by the user that submitted the request to access the application provisioned within the MCIE environment. The application access information may include access information associated with the application. The application access information may include domain identifiers, device identifiers, URLs, network addresses, etc. associated with the provisioned application. The application access information may include other and/or additional information associated with provisioned application without departing from embodiments disclosed herein.

In one or more embodiments disclosed herein, the method ends following Step 514.

At Step 516, a determination is made as to whether an error is identified. In one or more embodiments disclosed herein, the global controller monitors the parsing of the manifest and the scheduling of the application to identify any errors that may occur using any appropriate method of monitoring without departing from embodiments disclosed herein. The errors may include, for example, requested domains unavailable, manifest transmission timeout, scheduling retry count or time limit exceeded, and/or unknown application deployment information identified. The error may include other and/or additional types of error that may occur during the parsing of the manifest and the scheduling of the application without departing from embodiments disclosed herein. In one or more embodiments disclosed herein, if the global controller identifies that an error has occurred that may result in the failure to parse the manifest and/or schedule the application, then the global controller determines that an error is identified. In one or more embodiments disclosed herein, if the global controller does not identify that an error has occurred that may result in the failure to parse the manifest and/or schedule the application, then the global controller may determine that an error is not identified. The determination as to whether an error is identified may be made via other and/or additional methods without departing from embodiments disclosed herein.

In one or more embodiments disclosed herein, if it is determined that an error is identified, then the method proceeds to step 518. In one or more embodiments disclosed herein, if it is determined that an error is not identified, then the method proceeds to step 508 (e.g., continue monitoring for errors until the manifest is completely parsed and the application is completely scheduled).

At Step 518, the user correlation identifier and a failure indicator is provided to the user. In one or more embodiments disclosed herein, the correlation identifier and the failure indicator are provided to the user through the application service layer using any appropriate method of data transmission. As an example, the global controller may communicate the correlation identifier and the failure indicator as network data traffic units over a series of network devices that operatively connect the application service layer and the global controller. The failure indicator may be a flag, tag, message, etc. that indicates to the user that the application provisioning request was not successfully serviced. The correlation identifier and the failure indicator may be provided to the user via other and/or additional methods without departing from embodiments disclosed herein.

In one or more embodiments disclosed herein, the method ends following Step 518.

Second Example

The following section describes a second example in accordance with one or more embodiments described herein. The following example is for explanatory purposes only and not intended to limit the scope of embodiments described herein. Additionally, while the example shows certain aspects of embodiments described herein, all possible aspects of such embodiments may not be illustrated in these particular examples. The example is intended to include simple examples to illustrate, at least in part, concepts described herein.

Consider a scenario in which a global controller parses a manifest obtained from a user to provision an application within the MCIE environment. At a first point in time, the global controller obtains a request from the user through the application service layer. In response to obtaining the request, the global controller sends an acknowledgement to the user that the request is received. After obtaining the acknowledgement, the user sends an order identifier and a manifest to the global controller. The global controller then generates a correlation identifier to associate the application corresponding to the request with the order identifier and the user. The global controller then provides the correlation identifier to the user.

Upon receipt of the manifest, the global controller parses the manifest using a key value database to extract application deployment information as the manifest is being received. In other words, the global controller parses the manifest prior to obtaining the entirety of the manifest. Parsing the manifest using the key value data includes storing data objects parsed from the manifest with associated keys. The data objects include application deployment information (e.g., application tasks, scheduling requirements, scheduling policy selections, user specified geographical regions, etc.) and commands (e.g., API calls) to parse the manifest and/or to perform global scheduling of the application. As the global controller populates the key value database with application deployment information extracted from the manifest, the global controller performs global scheduling services to provision the application associated with the manifest in the MCIE environment. The global controller may quickly receive data objects (e.g., scheduling requirements, application tasks, etc.) from the key value database using the associated key to schedule the application based on the application deployment information as the manifest is parsed.

The global controller identifies that the application deployment information specifies that the application includes twenty application tasks. The global controller then identifies that the application deployment information further specifies that the user desires to provision the application in the geographical region of the state of California. The global controller then identifies, using capability information associated with the domains included in the MCIE environment, that the MCIE environment includes one cloud domain, eight core domains, and fifty edge domains in the state of California.

After identifying the domains included in the state of California, the global controller uses the scheduling requirements (e.g., hardware requirements) associated with each application tasks and capability information associated with the application tasks to identify target domains that satisfy the scheduling requirements. The target domains include the cloud domain, one of the eight core domains, and one of the fifty edge domains. Ten application tasks are to be scheduled into the cloud domain, seven application tasks are to be scheduled in the core domain, and the remaining three application tasks are to be scheduled in the edge domain. After identifying the target domains associated with each application task, the global controller then selects scheduling policies for each target domain. The global controller determines that the manifest specifies that the user has selected the default priority and selection of scheduling policies. As a result, each target domain will include the following scheduling policies in order from highest to lowest priority, makespan minimization, scheduling efficiency, resource utilization, and resource cost.

After determining that the parsing of the manifest is complete and target domains are identified for all application tasks included in the manifest, the global controller generates a scheduling package for each of the target domains. The scheduling packages include the application tasks scheduled to the corresponding domains. The scheduling packages also include the selected scheduling policies and application deployment information associated with each of the application tasks associated with the scheduling packages. The global controller then sends the scheduling packages to local controllers of the target domains (e.g., the cloud domain, the core domain, and the edge domain). In response to obtaining the scheduling packages, the local controller each perform domain level scheduling for the application tasks associated with their domains, thereby instantiating the application tasks on devices included in each of the domains.

As a result, the local controllers obtain application access information including URLs and network addresses that the user may use to access the portions of the application provisioned to the three domains. The local controller provides the application access information to the global controller, which then provides the application access information to the user through the application service layer. The global controller also generates a correlation identifier associated with the provisioned application. The correlation identifier may also be provided by the user, who may use the correlation identifier to access the application and submit future application provisioning request associated with the application.

End of Second Example

Figure 6:
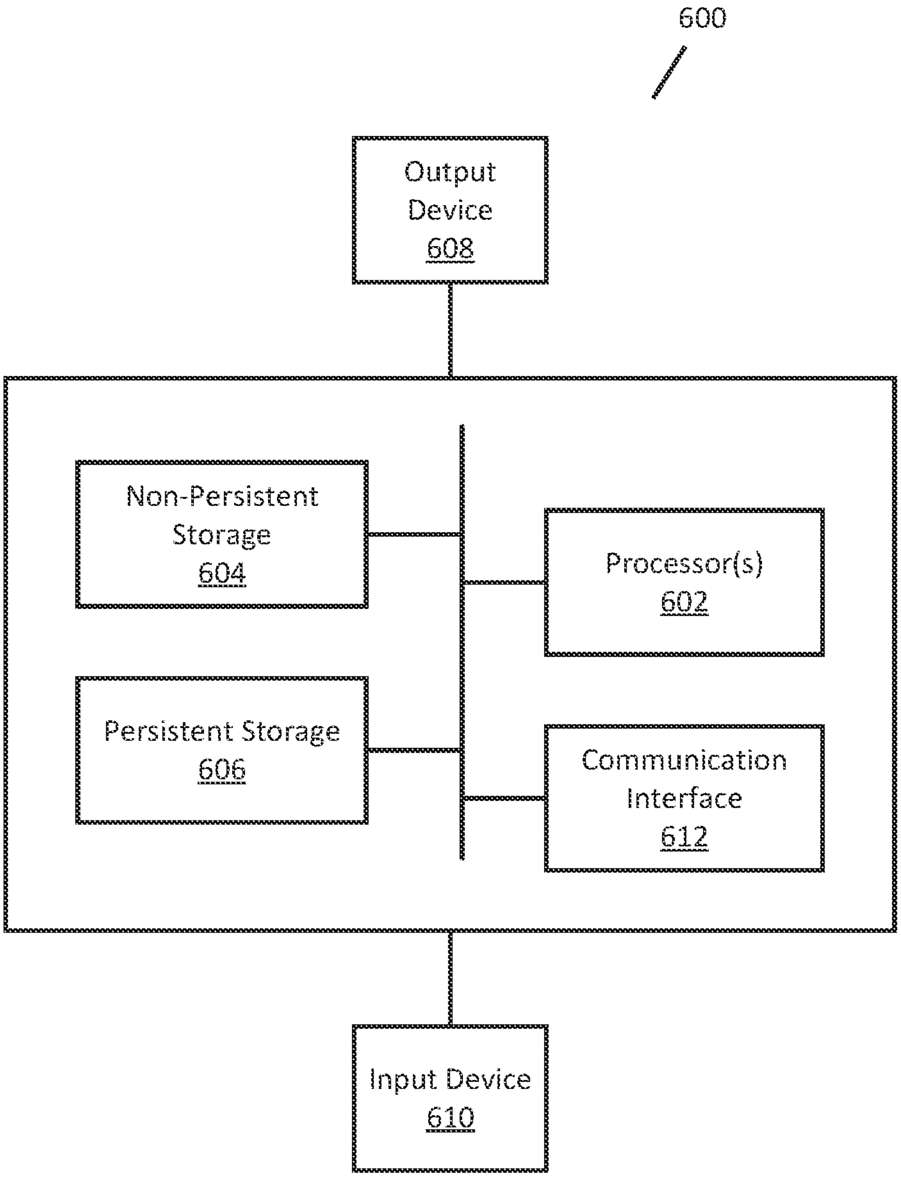
FIG. 6 shows a diagram of a computing device in accordance with one or more embodiments disclosed herein.

As discussed above, embodiments disclosed herein may be implemented using computing devices. FIG. 6 shows a diagram of a computing device in accordance with one or more embodiments disclosed herein. The computing device (600) may include one or more computer processors (602), non-persistent storage (604) (e.g., volatile memory, such as random access memory (RAM), cache memory), persistent storage (606) (e.g., a hard disk, an optical drive such as a compact disc (CD) drive or digital versatile disc (DVD) drive, a flash memory, etc.), a communication interface (612) (e.g., Bluetooth® interface, infrared interface, network interface, optical interface, etc.), input devices (610), output devices (608), and numerous other elements (not shown) and functionalities. Each of these components is described below.

In one embodiment disclosed herein, the computer processor(s) (602) may be an integrated circuit for processing instructions. For example, the computer processor(s) may be one or more cores or micro-cores of a processor. The computing device (600) may also include one or more input devices (610), such as a touchscreen, keyboard, mouse, microphone, touchpad, electronic pen, or any other type of input device. Further, the communication interface (612) may include an integrated circuit for connecting the computing device (600) to a network (not shown) (e.g., a local area network (LAN), a wide area network (WAN) such as the Internet, mobile network, or any other type of network) and/or to another device, such as another computing device.

In one embodiment disclosed herein, the computing device (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing devices exist, and the aforementioned input and output device(s) may take other forms.

Embodiments described herein use global controller to perform global level scheduling of applications within a distributed multi-tiered computing environment. In one or more embodiments, a user submits an application provisioning request and an associated manifest through an application service layer. When an application provisioning request and a manifest is obtained, the global controller uses the manifest to perform global level scheduling services. The global level scheduling services may include identifying target domains within the distributed multi-tiered computing environment and generating scheduling packages which may be used by local controllers of the target domains to perform domain level scheduling services. Performing global level management services may increase the efficiency of provisioning applications within the distributed multi-tiered computing environment, increase the likelihood of meeting the SLAs and SLOs for the application, and reduce the computational burden the global controller when provisioning applications portions. Such benefits may be achieved by performing domain level scheduling services at domains and device level scheduling services at devices based on the scheduling packages generated during the global level scheduling services.

The problems discussed above should be understood as being examples of problems solved by embodiments disclosed herein, and embodiments disclosed herein should not be limited to solving the same/similar problems. The embodiments disclosed herein are broadly applicable to address a range of problems beyond those discussed herein.

While embodiments described herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing a distributed multi-tiered computing (DMC) environment, comprising:

obtaining, by a global controller, a DMC environment management request from a user for application provisioning, wherein the DMC environment management request comprises a user identifier and a personal identification number (PIN); and in response to obtaining the request:

authenticating the DMC environment management request, wherein authenticating comprises verifying the user associated with the request by comparing the user identifier and the PIN to a list of registered users and PINs included in the global controller;

making a first determination that the DMC environment management request is a create request by searching a manifest of the DMC environment management request for a request directive, wherein the create request is associated with provisioning an application in the DMC environment;

in response to the first determination:

identifying application tasks associated with the create request specified in the manifest, wherein the application tasks are associated with the application to be provisioned;

identifying target domains for the application tasks using the manifest and capability information associated with domains included in the DMC environment, wherein for each application task the global controller identifies a target domain that satisfies scheduling requirements in the manifest, and wherein the scheduling requirements comprise user specified domain types, hardware requirements, and geographical requirements;

selecting scheduling policies for the target domains based on the manifest, the scheduling requirements, current load information of local controllers of the target domains, and predictive load information of the local controllers of the target domains, wherein:

the scheduling policies comprise makespan minimization, scheduling efficiency, resource utilization, and resource cost, the global controller selects and prioritizes the scheduling polices based on load information of the identified target domains, and the makespan minimization is deprioritized as a scheduling policy due to local controllers associated with the target domains having higher loads caused by large quantity of the application tasks;

making a second determination, based on the scheduling policies, that target domains are available with available capacity to execute the application tasks based on capacity information of the target domains obtained from the local controllers;

generating scheduling packages associated with the target domain of the DMC environment based on the second determination, wherein the scheduling packages are one or more data structures that may be used by the local controller of an associated target domain to perform domain level scheduling services and include the scheduling requirements, and comprise a portion of the application tasks to be scheduled on the target domains and the scheduling policies;

sending the scheduling packages to local controllers associated with the target domains;

instantiating, by the local controllers, the application tasks within the target domains to support a workflow based on the scheduling policies, wherein instantiating the application task generates application information;

obtaining the application information from the local controllers; and providing the application information to the user to allow the user to access the application.

2. The method of claim 1, wherein the DMC environment comprises a plurality of DMC domains.

3. The method of claim 2, wherein the target domains comprise a portion of the plurality of DMC domains.

4. The method of claim 2, wherein each DMC domain included in the plurality of DMC domains comprises a local controller and a device set.

5. The method of claim 4, wherein the plurality of DMC domains comprises:

edge domains, wherein an edge domain of the edge domains comprises an edge domain device set;

core domains, wherein a core domain of the core domain comprises a core domain device set; and cloud domains, wherein a cloud domain of the cloud domains comprises a cloud domain device set.

6. The method of claim 5, wherein the core domain device set comprises more computing resources than the edge domain device set, and wherein the cloud domain device set comprises more computing resources than the core domain device set.

7. A non-transitory computer readable medium comprising computer readable program code, which when executed by a computer processor enables the computer processor to perform a method for managing a distributed multi-tiered computing (DMC) environment, comprising:

obtaining, by a global controller, a DMC environment management request from a user for application provisioning, wherein the DMC environment management request comprises a user identifier and a personal identification number (PIN); and in response to obtaining the request:

authenticating the DMC environment management request, wherein authenticating comprises verifying the user associated with the request by comparing the user identifier and the PIN to a list of registered users and PINs included in the global controller;

making a first determination that the DMC environment management request is a create request by searching a manifest of the DMC environment management request for a request directive, wherein the create request is associated with provisioning an application in the DMC environment;

in response to the first determination:

identifying application tasks associated with the create request specified in the manifest, wherein the application tasks are associated with the application to be provisioned;

identifying target domains for the application tasks using the manifest and capability information associated with domains included in the DMC environment, wherein for each application task the global controller identifies a target domain that satisfies scheduling requirements in the manifest, and wherein the scheduling requirements comprise user specified domain types, hardware requirements, and geographical requirements;

selecting scheduling policies for the target domains based on the manifest, the scheduling requirements, current load information of local controllers of the target domains, and predictive load information of the local controllers of the target domains, wherein:

the scheduling policies comprise makespan minimization, scheduling efficiency, resource utilization, and resource cost, the global controller selects and prioritizes the scheduling polices based on load information of the identified target domains, and the makespan minimization is deprioritized as a scheduling policy due to local controllers associated with the target domains having higher loads caused by large quantity of the application tasks;

making a second determination, based on the scheduling policies, that target domains are available with available capacity to execute the application tasks based on capacity information of the target domains obtained from the local controllers;

generating scheduling packages associated with the target domain of the DMC environment based on the second determination, wherein the scheduling packages are one or more data structures that may be used by the local controller of an associated target domain to perform domain level scheduling services and include the scheduling requirements, and comprise a portion of the application tasks to be scheduled on the target domains and the scheduling policies;

sending the scheduling packages to local controllers associated with the target domains;

instantiating, by the local controllers, the application tasks within the target domains to support a workflow based on the scheduling policies, wherein instantiating the application task generates application information;

obtaining the application information from the local controllers; and providing the application information to the user to allow the user to access the application.

8. The non-transitory computer readable medium of claim 7, wherein the DMC environment comprises a plurality of DMC domains.

9. The non-transitory computer readable medium of claim 8, wherein the target domains comprise a portion of the plurality of DMC domains.

10. The non-transitory computer readable medium of claim 8, wherein each DMC domain included in the plurality of DMC domains comprises a local controller and a device set.

11. The non-transitory computer readable medium of claim 10, wherein the plurality of DMC domains comprises:

edge domains, wherein an edge domain of the edge domains comprises an edge domain device set;

core domains, wherein a core domain of the core domain comprises a core domain device set; and cloud domains, wherein a cloud domain of the cloud domains comprises a cloud domain device set.

12. The non-transitory computer readable medium of claim 11, wherein the core domain device set comprises more computing resources than the edge domain device set, and wherein the cloud domain device set comprises more computing resources than the core domain device set.

13. A system for managing a distributed multi-tiered computing (DMC) environment, the system comprising:

a DMC environment; and a global controller of the DMC environment, comprising a processor and memory, and configured to:

obtain a DMC environment management request from a user for application provisioning, wherein the DMC environment management request comprises a user identifier and a personal identification number (PIN); and in response to obtaining the request:

authenticate the DMC environment management request, wherein authenticating comprises verifying the user associated with the request by comparing the user identifier and the PIN to a list of registered users and PINs included in the global controller;

make a first determination that the DMC environment management request is a create request by searching a manifest of the DMC environment management request for a request directive, wherein the create request is associated with provisioning an application in the DMC environment;

in response to the first determination:

identify application tasks associated with the create request specified in the manifest, wherein the application tasks are associated with the application to be provisioned;

identify target domains for the application tasks using the manifest and capability information associated with domains included in the DMC environment, wherein for each application task the global controller identifies a target domain that satisfies scheduling requirements in the manifest, and wherein the scheduling requirements comprise user specified domain types, hardware requirements, and geographical requirements;

select scheduling policies for the target domains based on the manifest, the scheduling requirements, current load information of local controllers of the target domains, and predictive load information of the local controllers of the target domains, wherein:

the scheduling policies comprise makespan minimization, scheduling efficiency, resource utilization, and resource cost, the global controller selects and prioritizes the scheduling polices based on load information of the identified target domains, and the makespan minimization is deprioritized as a scheduling policy due to local controllers associated with the target domains having higher loads caused by large quantity of the application tasks;

make a second determination, based on the scheduling policies, that target domains are available with available capacity to execute the application tasks based on capacity information of the target domains obtained from the local controllers;

generate scheduling packages associated with the target domain of the DMC environment based on the second determination, wherein the scheduling packages are one or more data structures that may be used by the local controller of an associated target domain to perform domain level scheduling services and include the scheduling requirements, and comprise a portion of the application tasks to be scheduled on the target domains and the scheduling policies;

send the scheduling packages to local controllers associated with the target domains;

instantiate, by the local controllers, the application tasks within the target domains to support a workflow based on the scheduling policies, wherein instantiating the application task generates application information;

obtain the application information from the local controllers; and provide the application information to the user to allow the user to access the application.

14. The system of claim 13, wherein the DMC environment comprises a plurality of DMC domains.

15. The system of claim 14, wherein the target domains comprise a portion of the plurality of DMC domains.

16. The system of claim 14, wherein each DMC domain included in the plurality of DMC domains comprises a local controller and a device set.

17. The system of claim 16, wherein the plurality of DMC domains comprises:

edge domains, wherein an edge domain of the edge domains comprises an edge domain device set;

core domains, wherein a core domain of the core domain comprises a core domain device set; and cloud domains, wherein a cloud domain of the cloud domains comprises a cloud domain device set.

* * * * *